US011234094B2

(12) United States Patent
Igarashi et al.

(10) Patent No.: US 11,234,094 B2
(45) Date of Patent: Jan. 25, 2022

(54) INFORMATION PROCESSING DEVICE, INFORMATION PROCESSING METHOD, AND INFORMATION PROCESSING SYSTEM

(71) Applicant: Sony Corporation, Tokyo (JP)

(72) Inventors: Tatsuya Igarashi, Tokyo (JP); Akira Yoshida, Tokyo (JP); Yuhki Mitsufuji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/252,289

(22) PCT Filed: Apr. 25, 2019

(86) PCT No.: PCT/JP2019/017801
§ 371 (c)(1),
(2) Date: Dec. 15, 2020

(87) PCT Pub. No.: WO2020/003730
PCT Pub. Date: Jan. 2, 2020

(65) Prior Publication Data
US 2021/0266692 A1 Aug. 26, 2021

(30) Foreign Application Priority Data
Jun. 25, 2018 (JP) .............................. JP2018-120152

(51) Int. Cl.
*H04S 7/00* (2006.01)
*G10L 15/22* (2006.01)
(Continued)

(52) U.S. Cl.
CPC .............. *H04S 7/302* (2013.01); *G10L 15/22* (2013.01); *H04N 21/42203* (2013.01);
(Continued)

(58) Field of Classification Search
CPC .. H04S 2420/01; H04S 2400/01; H04S 7/302; H04S 7/305; H04S 2400/13;
(Continued)

(56) References Cited

U.S. PATENT DOCUMENTS 9,564,129 B2 2/2017 Amano et al.
2016/0042748 A1 2/2016 Jain et al.
(Continued)

FOREIGN PATENT DOCUMENTS

JP 2007-143010 A 6/2007
JP 2008-92193 A 4/2008
(Continued)

OTHER PUBLICATIONS

International Search Report and Written Opinion dated Jul. 30, 2019, received for PCT Application No. PCT/JP2019/017801, Filed on Apr. 25, 2019, 6 pages including English Translation.

*Primary Examiner* — Paul Kim
(74) *Attorney, Agent, or Firm* — Xsensus LLP

(57) ABSTRACT

Provided is an information processing device that processes a dialogue of an audio agent.
The information processing device includes an acquisition unit that acquires audio information of an agent device that is played back through interaction with a user and audio information of other contents different from the audio information of the agent device, and a controller that performs sound field control processing on an audio output signal based on the audio information of the agent device acquired by the acquisition unit. The controller performs wavefront composition of pieces of audio output from a plurality of speakers, controls a sound field of the agent device, and avoids mixing with the other contents different from the audio information of the agent device.

19 Claims, 12 Drawing Sheets

(51) Int. Cl.
*H04N 21/422* (2011.01)
*H04R 5/04* (2006.01)
(52) U.S. Cl.
CPC .............. *H04R 5/04* (2013.01); *H04S 7/305* (2013.01); *H04R 2499/15* (2013.01); *H04S 2400/01* (2013.01); *H04S 2400/13* (2013.01); *H04S 2420/01* (2013.01)
(58) Field of Classification Search
CPC ....... G10L 15/22; H04R 5/04; H04R 2499/15; H04N 21/42203
USPC .......................................................... 381/17
See application file for complete search history.

(56) References Cited

U.S. PATENT DOCUMENTS

2016/0322048 A1* 11/2016 Amano ................... G06F 3/167
2017/0325026 A1   11/2017 Kon

FOREIGN PATENT DOCUMENTS

| | | |
|---|---|---|
| JP | 2008-252455 A | 10/2008 |
| JP | 2016-100613 A | 5/2016 |
| JP | 2017-527844 A | 9/2017 |
| WO | 2014/203495 A1 | 12/2014 |

* cited by examiner

INFORMATION PROCESSING DEVICE, INFORMATION PROCESSING METHOD, AND INFORMATION PROCESSING SYSTEM

CROSS-REFERENCE TO RELATED APPLICATIONS

The present application is based on PCT filing PCT/JP2019/017801, filed Apr. 25, 2019, which claims priority to JP 2018-120152, filed Jun. 25, 2018, the entire contents of each are incorporated herein by reference.

TECHNICAL FIELD

The technology disclosed herein relates to an information processing device, an information processing method, and an information processing system for processing an audio-based dialogue of an agent.

BACKGROUND ART

Recently, agents that present various kinds of information to a user depending on the use and the situation while interacting with the user using audio and the like have begun to spread. For example, in addition to turning on and off and adjusting operations for home appliances such as lighting and air conditioners, there are known agents that respond by voice when asked about weather forecasts, stock and exchange information, and news, accept orders for products, and read out the contents of purchased books.

An agent function is generally provided by a link between an agent device installed around the user at home or the like and an agent service built on a cloud (for example, see Patent Document 1). For example, the agent device mainly provides a user interface such as an audio input for receiving a voice uttered by the user and an audio output for answering an inquiry from the user by voice. On the other hand, the agent service side executes heavy processing such as recognition or semantic analysis of an audio input by the agent device, processing such as information retrieval in response to the user inquiry, and audio composition based on the processing result.

Furthermore, the agent device that directly interacts with the user may be not only a dedicated device, but also any of various CE devices such as television receivers, air conditioners, recorders, and washing machines installed indoors, or of various information devices with built-in agent applications, such as Internet of Thing (IoT) devices, portable information terminals such as smartphones and tablets, interactive robots, and car navigation systems installed in cars. (see, for example, Patent Document 2).

CITATION LIST

Patent Document

Patent Document 1: Japanese Patent Application Laid-Open No. 2017-527844
Patent Document 2: WO2014/203495
Patent Document 3: Japanese Patent Application Laid-Open No. 2007-143010
Patent Document 4: Japanese Patent Application Laid-Open No. 2016-100613

SUMMARY OF THE INVENTION

Problem to be Solved by the Invention

An object of the technology disclosed herein is to provide an information processing device, an information processing method, and an information processing system for processing an audio-based dialogue of an agent.

Solutions to Problems

A first aspect of the technology disclosed herein is an information processing device including:
an acquisition unit that acquires audio information of an agent device that is played back through interaction with a user and audio information of other contents different from the audio information of the agent device; and
a controller that performs sound field control processing on an audio output signal based on the audio information of the agent device acquired by the acquisition unit.

The acquisition unit acquires the information related to a content being played back through interaction with an application linked to a content being played back on the agent device.

Furthermore, the controller performs wavefront composition of pieces of audio output from a plurality of speakers, controls a sound field of the agent device, avoids mixing with audio information of other contents different from the audio information of the agent device, and localizes a sound image at an appropriate place.

Furthermore, a second aspect of the technology disclosed herein is an information processing method including:
an acquisition step of acquiring audio information of an agent device that is played back through interaction with a user and audio information of other contents different from the audio information of the agent device; and
a control step of performing sound field control processing on an audio output signal based on the audio information of the agent device acquired by the acquisition unit.

Furthermore, a third aspect of the technology disclosed herein is an information processing system including:
an agent device that plays back audio information through interaction with a user; and
a control device that acquires audio information of the agent device and audio information of other contents different from the audio information of the agent device, and performs sound field control processing on an audio output signal based on the audio information of the agent device.

However, the term "system" as used herein refers to a logical collection of a plurality of devices (or functional modules that implement a specific function), and it does not matter whether or not each device or functional module is contained in a single housing.

Effects of the Invention

According to the technology disclosed herein, it is possible to provide an information processing device, an information processing method, and an information processing system for processing an audio-based dialogue of an agent.

Note that the effects described herein are merely examples, and the effects of the present invention are not limited to those. Furthermore, in addition to the effects described above, the present invention may have additional effects.

Other objects, features, and advantages of the technology disclosed herein will become apparent from the more detailed description based on the embodiments as described later and the accompanying drawings.

MODE FOR CARRYING OUT THE INVENTION

Hereinafter, embodiments of the technology disclosed herein will be described in detail with reference to the drawings.

Figure 1:
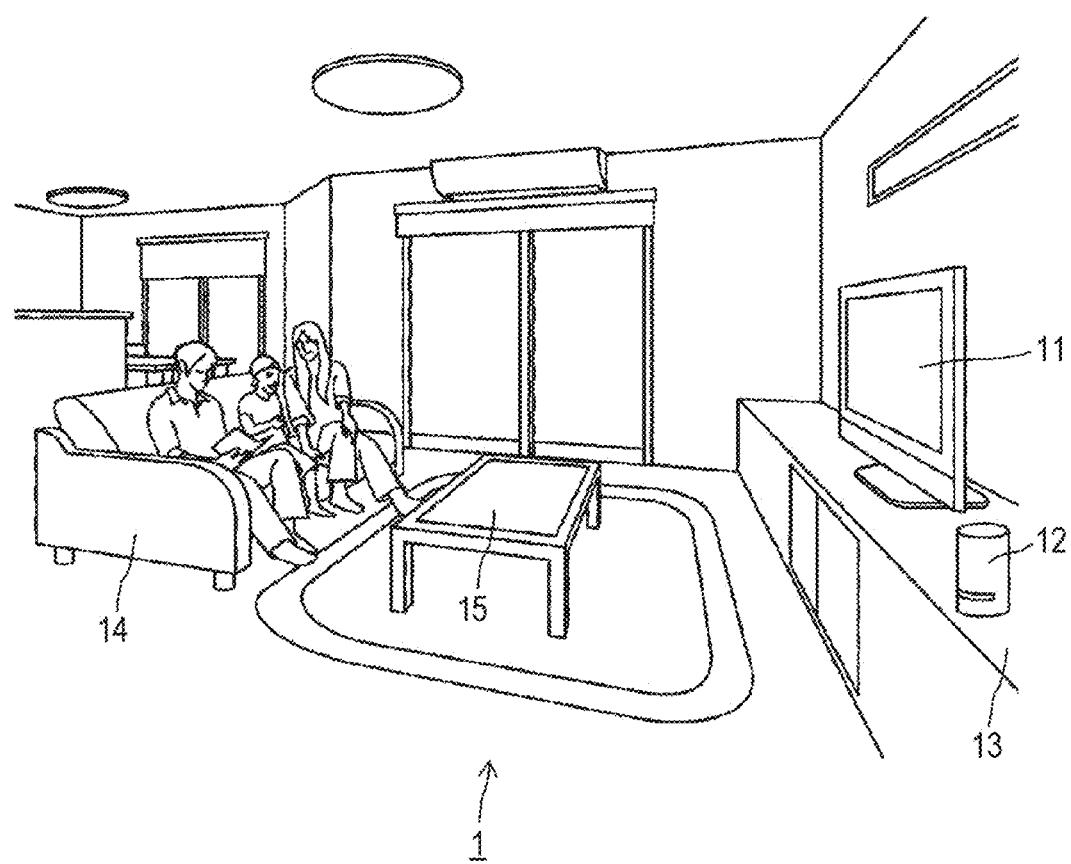
FIG. 1 is a diagram showing an example of an application environment of the technology disclosed herein.

FIG. 1 shows a living room 1 as an example of an application environment of the technology disclosed herein. A television receiver 11 and an agent device 12 are installed on a sideboard 13. As will be described later, the television receiver 11 has an incorporated agent application and can also operate as an agent device. Audio recognition and audio response processing or the like executed by the agent device may be referred to as an agent function. Furthermore, as will be described in detail later, the agent function may be partially or wholly processed on a server. The use of audio as an agent function may be, herein, referred to as an "audio agent".

Furthermore, a sofa 14 is installed in the living room 1 so as to face the television receiver 11, and a sofa table 15 is provided in front of the sofa 14.

In the example shown in FIG. 1, three people, specifically, parents and a child are sitting on the sofa 14. The three people are not only viewers of a television program displayed on the television receiver 11 but also users of the agent (agent function) or agent device 12 incorporated in the television receiver 11, and they inquire the agent and wait for a reply. Furthermore, each user can perform various remote control operations such as channel selection, volume adjustment, and switching of an input/output device of the television receiver 11 using a remote controller (not shown). Alternatively, each user can instruct, by voice, the agent incorporated in the television receiver 11 to perform the various operations such as channel selection, volume adjustment, and switching of an input/output device of the television receiver 11.

The television receiver 11 can select and receive a broadcasting signal via a built-in tuner or an external tuner. Furthermore, the television receiver 11 is equipped with a network interface card, and can transmit and receive data related to visual communication such as Over the Top (OTT) service and video conference provided by the provider. Furthermore, on the television receiver 11, it is possible to execute pre-installed applications such as an audio agent or an assistant.

Figure 13:
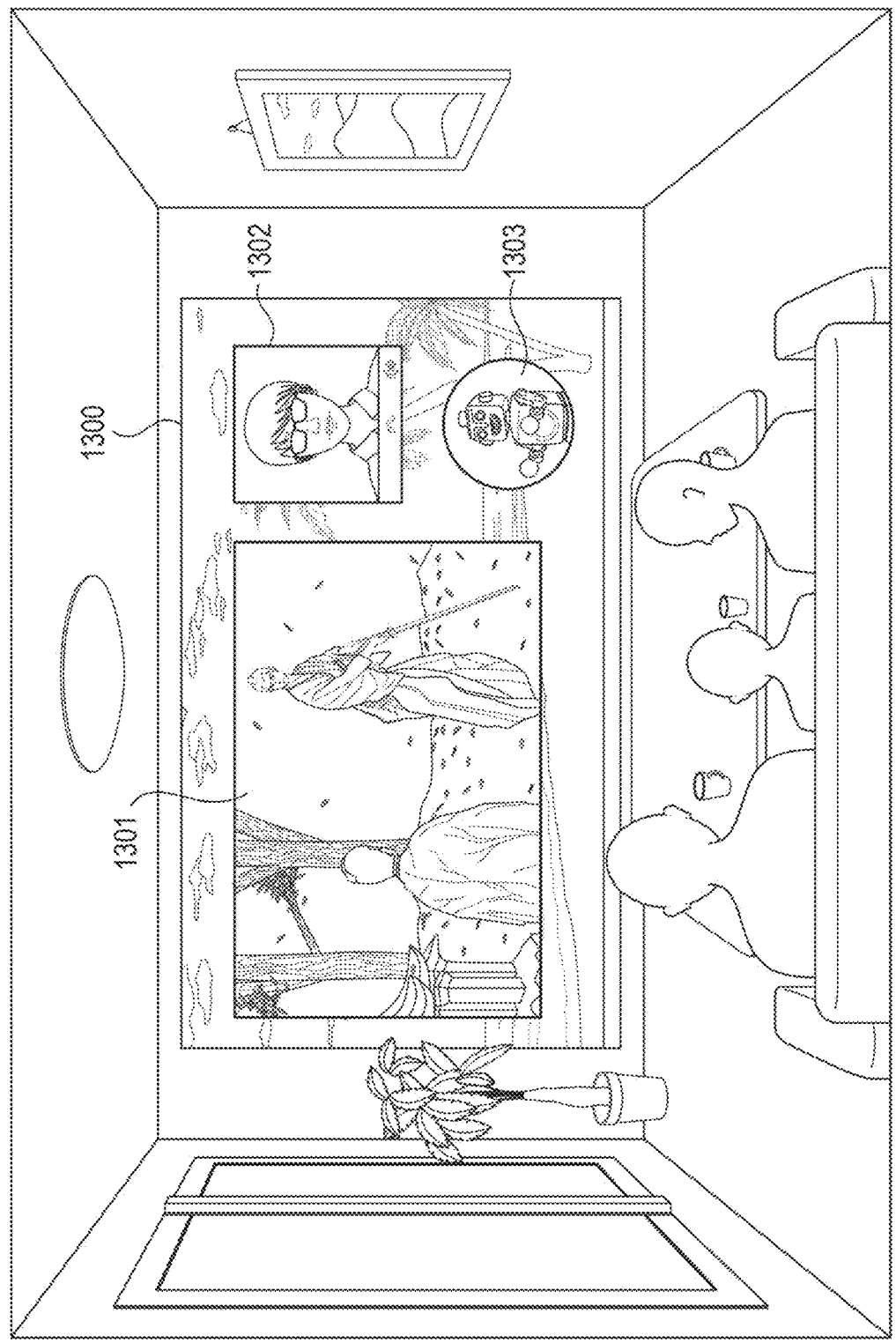
FIG. 13 is a diagram showing a configuration of a television screen 1300.

Therefore, on a screen of the television receiver 11, at least one of a plurality of contents such as a broadcasting content on the air or recorded, a streaming content distributed by OTT service, visual communication such as video conference (or web conference), an audio agent or an assistant character is displayed. Furthermore, it is also possible to display two or more contents in parallel on a large screen using technologies such as Picture in Picture (PIP) and Picture and Picture (PAP). FIG. 13 shows a display example 1300 of the screen of the television receiver 11. In the example shown in the figure, a broadcasting content 1301 on the air, visual communication 1302, and an audio agent character 1303 are displayed in parallel on a large screen 1300 of a television. Furthermore, although omitted in FIG. 13, graphic information such as an On Screen Display (OSD) generated inside the television receiver 11 can be displayed on the large screen.

Then, a sound wave of the audio emitted from the television receiver 11 reaches the three people sitting on the sofa 14 as a direct wave, and also reaches as a reflected wave from a wall surface, a ceiling, or a floor surface. The audio emitted from the television receiver 11 includes audio of a television program being selected and received, and composited audio returned from the agent. Similarly, the audio emitted from the agent device 12 reaches not only the three people sitting on the sofa 14 as a direct wave but also a reflected wave from the wall surface, ceiling, or floor surface.

Note that the application environment of the technology disclosed herein is not limited to the living room shared by a family member in a general home as shown in FIG. 1. The technology disclosed herein can also be applied to various rooms in which the television receiver that provides the agent function is installed, such as a private room of a specific user such as a study room or a bedroom. Furthermore, the technology disclosed herein can be applied not only in the home but also in an office of a company.

Figure 2:
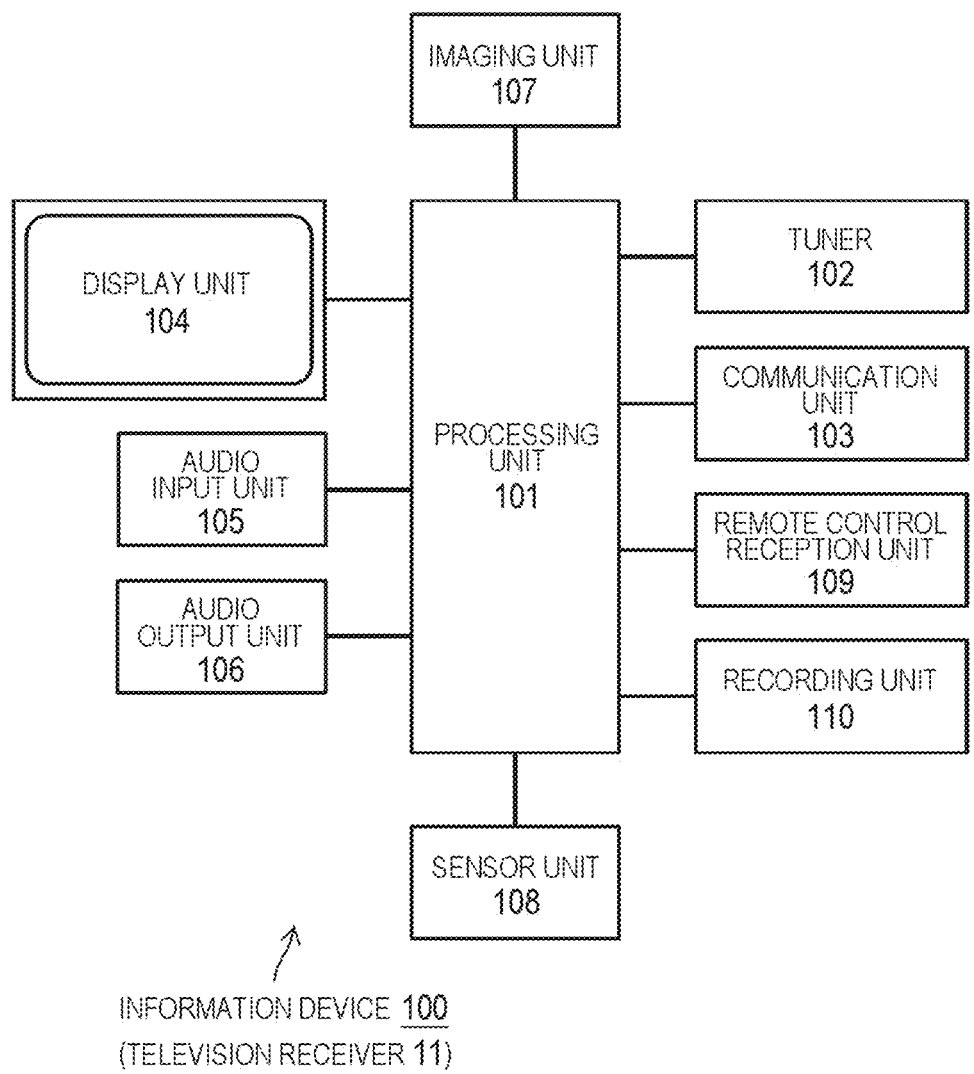
FIG. 2 is a diagram schematically showing a configuration example of an information device 100 capable of operating as an agent device.

FIG. 2 schematically shows a configuration example of an information device 100 capable of operating as an agent device. Here, the television receiver 11 in FIG. 1 is assumed as the information device 100. The information device 100 includes a processing unit 101, a tuner 102, a communication unit 103, a display unit 104, an audio input unit 105, an audio output unit 106, an imaging unit 107, a sensor unit 108, a remote control reception unit 109, and a recording unit 110.

The tuner 102 selects and receives broadcasting signals of terrestrial broadcasting and satellite broadcasting. Furthermore, the communication unit 103 is connected to an external network such as the Internet by using wired communication such as Ethernet (registered trademark) or wireless communication such as Wi-Fi (registered trademark). For example, the communication unit 103 receives the streaming content distributed by the OTT service provided by the provider. Furthermore, the communication unit 103 transmits and receives data related to visual communication such as a video conference. Furthermore, the communication unit 103 includes a communication interface for transmitting video and audio digital signals such as high definition multimedia interface (HDMI) (registered trademark), and can be used to externally connect a video recording and reproducing device such as a Blu-ray or hard disk, a game machine, or the like to the information device 100. Furthermore, the communication unit 103 may be interconnected with each CE device in the home via a home network in accordance with a standard such as Digital Living Network Alliance (DLNA) (registered trademark), and may further include a function of interfacing with the IoT device.

The display unit 104 is constituted by, for example, liquid crystal or organic electroluminescence (EL) elements, and includes a screen having an aspect ratio of 16:9. The display unit 104 is used to display the video of the broadcasting content selected and received by the tuner 102 and the streaming content received via the communication unit 103, the electronic program guide (EPG), and the data broadcasting content, display the streaming content distributed by the OTT service, and display a video of visual communication such as a video conference. Furthermore, the display unit 104 is also used to display images of applications installed, in advance, on the information device 100 (television receiver 11) such as the audio agent and graphics such as OSD. Note that a touch sensor may be superimposed on a part or the whole of the screen of the display unit 104.

The audio input unit 105 is constituted by a sound collection element such as a microphone, and is used to input audio generated in a room where the information device 100 is installed. Examples of the audio generated in the room can include an utterance by a viewer of a television program or a user who uses the audio agent. The audio input unit 105 may include a microphone array in which a plurality of microphones is combined. Some or all of the microphones may be externally connected to the information device 100. Alternatively, the microphone mounted on the remote controller for the television receiver 11 may be included, or the microphone mounted on the external device of the television receiver 11 such as a smartphone or a wearable device may be included. In a case where the audio input unit 105 includes the plurality of microphones, beam form processing can increase sound collection sensitivity of audio from a desired sound source position, for example, voice of a user speaking to the audio agent, or conversely, can reduce audio collection sensitivity of audio from an unnecessary sound source position, for example, voice of another user or a sound output from another AV device in the room.

The audio output unit 106 is used for audio output of a program content and a data broadcasting content selected and received by the tuner 102, and output of composited audio of the audio agent function. The audio output unit 106 is constituted by a sound generating element such as a speaker. In the present embodiment, it is assumed that the audio output unit 106 includes a speaker array (multichannel speaker or ultra-multi-channel speaker) in which a plurality of speakers is combined (some or all speakers may be externally connected to the information device 100 (television receiver 11)). Therefore, the audio output unit 106 can generate a sound field on the basis of an output control of each speaker to localize a sound image at a desired position, or can make it difficult to hear the audio from a place other than the desired position.

Figure 9:
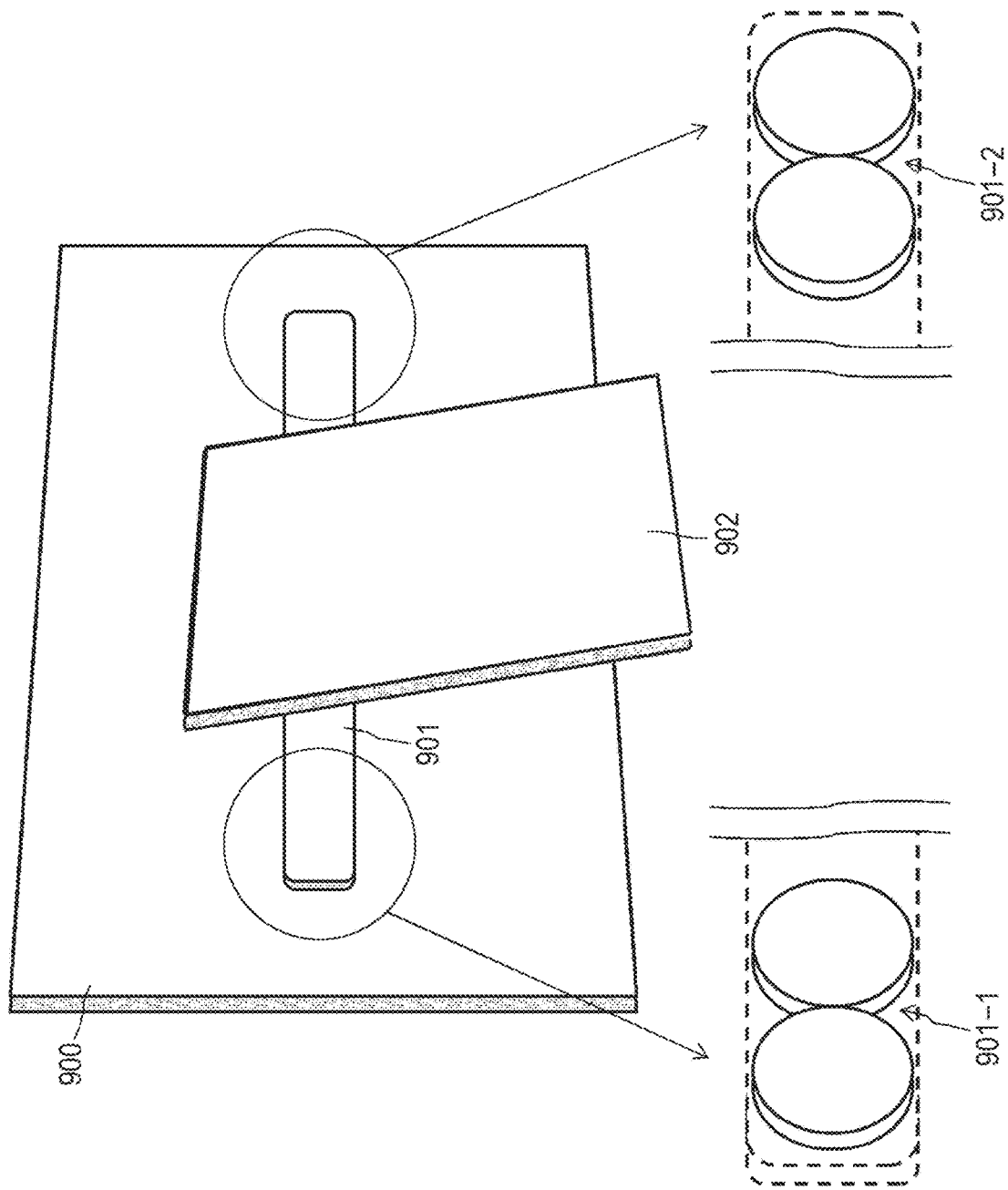
FIG. 9 is a diagram showing an application example of a panel speaker technology.

In addition to a cone type speaker, a flat panel type speaker (for example, see Patent Document 3) can be used as the audio output unit 106. Of course, a speaker array in which different types of speakers are combined can also be used as the audio output unit 106. Furthermore, the speaker array may include a speaker array that outputs audio by vibrating the display unit 104 by one or more exciters (actuators) that generate vibration. The exciter (actuator) may be in a form that is post-attached to the display unit 104. FIG. 9 shows an application example of a panel speaker technology to a display. A display 900 is supported by a stand 902 on a back surface. Furthermore, a speaker unit 901 is attached to a back surface of the display 900. An exciter (actuator) 901-1 is arranged at a left end of the speaker unit 901 and, furthermore, an exciter (actuator) 901-2 is arranged at a right end, thereby forming a speaker array. Each exciter (actuator) 901-1 and 901-2 can vibrate the display 901 on the basis of left and right audio signals to output sound. Furthermore, the stand 902 may have a built-in subwoofer that outputs low-pitched sound. Note that the display 900 corresponds to the display unit 104 using the organic EL element.

In a case where the audio output unit 106 includes a plurality of speakers, the sound image can be localized at a desired position (for example, the sound image of the audio of the audio agent is localized at a place that is a predetermined relative position to an inquiring user, or is localized at a place that does not mix with the audio of the television program), and it is possible to make it difficult to hear the audio from a place other than the desired position. Furthermore, a sound field reproduction method such as "wavefront composition" (see, for example, Patent Document 4) in which a wavefront of audio in a sound field is collected by a plurality of microphones and the sound field is reproduced on the basis of the obtained sound collection signal can also be used.

The imaging unit 107 is, for example, constituted by a camera including an image sensor such as a complementary metal oxide semiconductor (CMOS) or a charge coupled device (CCD), and mainly captures an image of a user in a front direction of the information device 100, for example, in front of the screen of the display unit 104. The imaging unit 107 may be, for example, a stereo camera using two cameras or a multi-lens camera using three or more cameras. Furthermore, some or all of the cameras may be externally connected to the information device 100.

The sensor unit 108 mainly senses environmental information of the room where the information device 100 is installed. A configuration of the sensor unit 108, that is, what kind of sensor element is included is arbitrary. For example, the sensor unit 108 may include an object detection sensor and a depth sensor. On the basis of the detection results of the object detection sensor and the depth sensor (if necessary, the image captured by the imaging unit 107 together with the image recognition result), a furniture installed in the room and a layout of the room can be detected. Furthermore, the sensor unit 108 may include an environment sensor that detects environment information such as an illuminance sensor, a temperature sensor, and a humidity sensor. Furthermore, the sensor unit 108 may include an infrared sensor or a human sensor. Furthermore, the sensor unit 108 may include a biological sensor that detects a user's pulse, sweating, brain waves, myoelectric potential, expiration, and the like. A part or all of the sensor unit constituting the sensor unit 108 may be externally connected or wirelessly connected to the information device 100.

The remote control reception unit 109 receives and processes a remote control command transmitted from a remote controller (not shown) using infrared communication, short-range wireless communication, or the like. An operator of the remote controller is, for example, a viewing user of the television receiver 11 in the living room shown in FIG. 1.

The recording unit 110 is constituted by a large-capacity recording device such as a hard disc drive (HDD), and is mainly used for recording the program content received by the tuner 102. In addition to being arranged inside the information device 100, the recording unit 110 may be externally connected to the information device 100 via an interface such as high definition multimedia interface (HDMI) (registered trademark) or universal serial bus (USB).

The processing unit 101 includes a processor and a memory, executes a program loaded in the memory, performs various types of processing, and centrally controls the operation in the information device 100. In the processing unit 101, various applications are basically executed under an execution environment provided by an operating system (OS). For example, in a case where a multiprocessor is available, or in a case where multithread execution is possible by the OS, all processing units that can be executed in parallel can be read into the memory and executed in parallel.

Examples of the processing executed by the processing unit 101 include operations in the device 100 such as channel selection, volume adjustment, recording, and image quality adjustment in response to the remote control command received by the remote control reception unit 109, video and audio output processing of a program content selected and received by tuner 102, playback output processing of a program content recorded in the recording unit 110, playback output processing of a streaming content distributed by the OTT service, application execution, OSD display control, and the like. Among the applications executed by the processing unit 101, there can be applications pre-installed in the processing unit 101 such as data broadcasting applications and OTT service applications received via the tuner 102 or the communication unit 103, an audio agent, and a visual communication. Furthermore, the information device 100 can function as a plurality of agent devices by the processing unit 101 executing a plurality of agent applications in parallel.

The information device 100 includes a function of displaying various types of videos such as video and audio output of a selected and received broadcasting content, playback output of a streaming content distributed by the OTT service, playback output of visual communication such as the video conference, and display of graphics such as the audio agent. Furthermore, the information device 100 can also display two or more videos in parallel by the PIP or PAP function.

Furthermore, in the present embodiment, the information device 100 is adapted to perform sound image localization that matches a sound image with an image. This is because when audio corresponding to the video is localized at a position different from a display position of the video, the user who views the screen feels uncomfortable. The information device 100 detects a sound source appearing in a video, calculates a display position of the sound source on the screen, and performs audio signal processing for localizing the audio emitted from the sound source to the display position of the sound source, and tries to match the sound image with the image.

Here, the processing for matching the sound image with the image when displaying each of the video content (including broadcasting and OTT service), visual communication, and graphics in the information device 100 will be described.

(1) In Case of Video Content

In a case where the video is a broadcasting content or a streaming content of an OTT service, the sound source that appears in the video is a performer of the television program (or a speaker displayed on the screen). For example, the sound source can be detected by detecting a face position of the performer in the image by video analysis. When a plurality of performers is displayed at the same time, the face position of each performer is detected as a sound source. Alternatively, face position data of each performer may be transmitted as meta information of the broadcasting content. When the television program is displayed in full screen, the detected face position becomes the display position of the sound source. Furthermore, in a case where a multi-window is applied, the face position in the window for displaying the television program is calculated as the display position of the sound source. Then, every time each performer speaks, audio signal processing is performed so that the sound image of the audio is localized at the position where the face of the performer is displayed on the screen, and the audio is output from the audio output unit 106.

Figure 10:
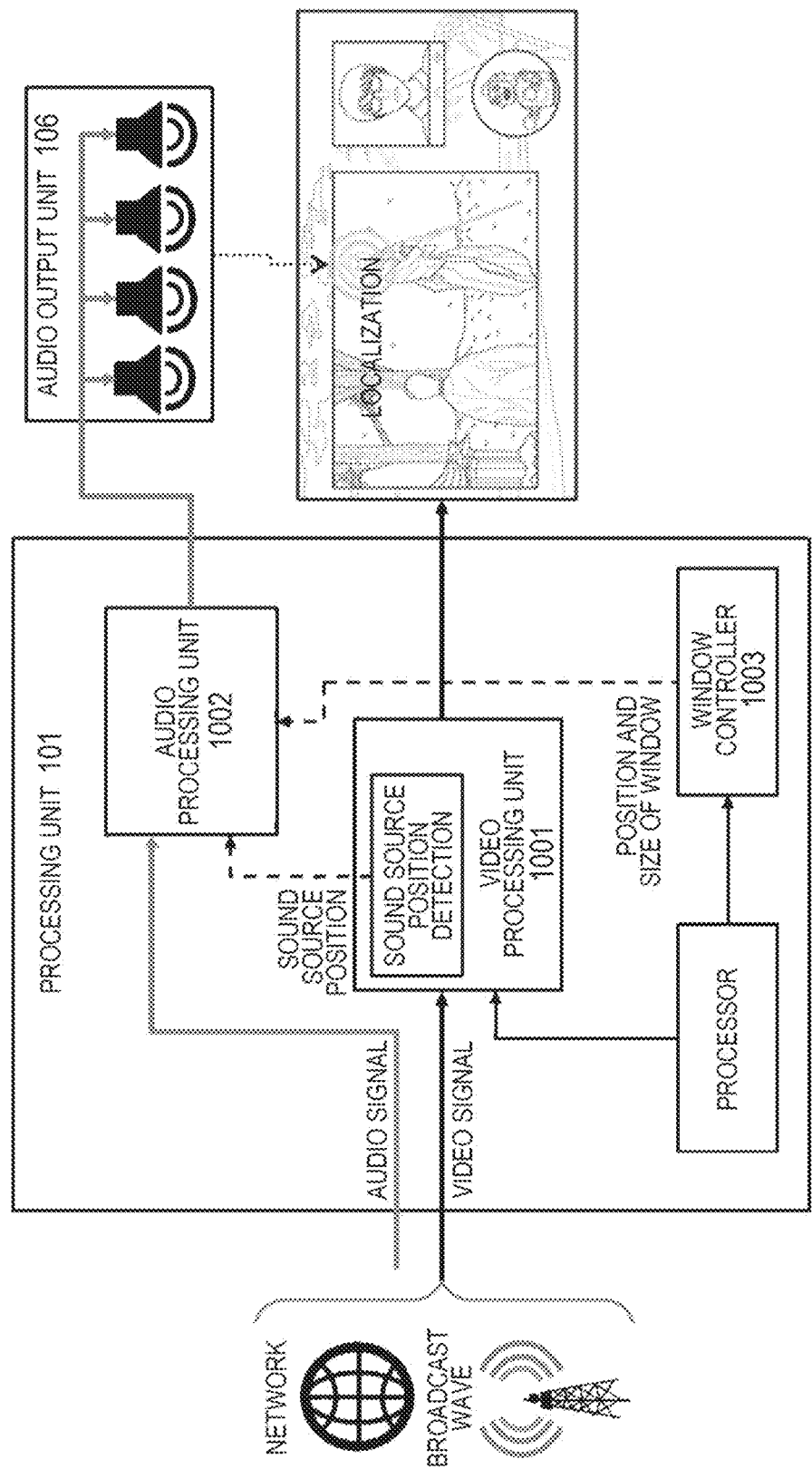
FIG. 10 is a diagram showing a functional configuration for performing processing of matching a sound image with an image on a video content.

FIG. 10 schematically shows a functional configuration for performing processing of matching a sound image with an image on a video content. However, each functional module shown in FIG. 10 is basically implemented in the processing unit 101. Furthermore, it is assumed that the broadcasting content selected and received by the tuner 102 and the streaming content of the OTT service received by the communication unit 103 are demultiplexed into video and audio, are further decoded for each of the video signal and the audio signal, and are then input to the processing unit 101.

When the video processing unit 1001 inputs the decoded video signal, the video processing unit 1001 detects a position of a sound source included in a video frame. The sound source is a speaker such as a performer of a program. In a case where an object that outputs sound, such as a musical instrument, is included in the frame, these are also used as sound sources for position detection. The video processing unit 1001 detects the sound source by detecting a face position of the speaker in the image by, for example, video analysis in the process of adjusting the image quality of the video signal. Alternatively, in a case where the meta information transmitted along with a stream includes information on the sound source position, the sound source position may be detected by decoding processing of the meta information. In a case where a plurality of speakers is included in the video at the same time, the video processing unit 1001 detects each speaker as a sound source and detects the sound source position. The video signal processed by the video processing unit 1001 is once written to a video plane in a video memory (not shown in FIG. 3), and is then superimposed on the image information of other planes, and is displayed and output on the screen of the display unit 104.

When the audio processing unit 1002 inputs the decoded audio signal, the audio processing unit 1002 outputs audio using a plurality of speakers included in the audio output unit 106. In a case where the position information of the sound source is given from the video processing unit 1001, the audio processing unit 1002 localizes the sound image at the position of the sound source and outputs the audio from the audio output unit 106.

In a case where the video frame is displayed in full screen on the display unit 104, the audio processing unit 1002 converts the sound source position detected by the video processing unit 1001 into information on the display position on the screen, and performs sound image localization. On the other hand, in a case where the multi-window is applied to the screen of the display unit 104, if the audio processing unit 1002 acquires information on the display position and size of a window assigned to display the video from a window controller 1003, the sound source position in the frame detected by the video processing unit 1001 is converted into a position in the window, information on the position of the sound source on the screen is obtained by adding the display position (offset) of the window to the converted position, and the sound image localization is performed.

In the case of a video including a plurality of sound sources (for example, when a plurality of speakers appears in the video at the same time), the video processing unit 1001 detects a sound source position for each speaker, and the audio processing unit 1002 separates the input audio signal into audio for each sound source (for example, for each speaker), localizes each sound source to the corresponding sound source position, and outputs the audio from the audio output unit 106.

(2) In Case of Visual Communication

In a case where the video is visual communication such as a video conference, the sound source that appears in the video is a participant of the video conference. For example, the sound source can be detected by detecting a face position of a conference attendee in the image by video analysis. In a case where there is a plurality of conference participants, the face position of each conference participant is detected as the sound source. Then, in a window of visual communication, the face position of the conference participant is calculated as a display position of the sound source. Then, every time the conference participant speaks, the audio signal processing is performed so that a sound image of the audio is localized at the face position of the corresponding conference participant, and an audio signal is output from the audio output unit 106.

Figure 11:
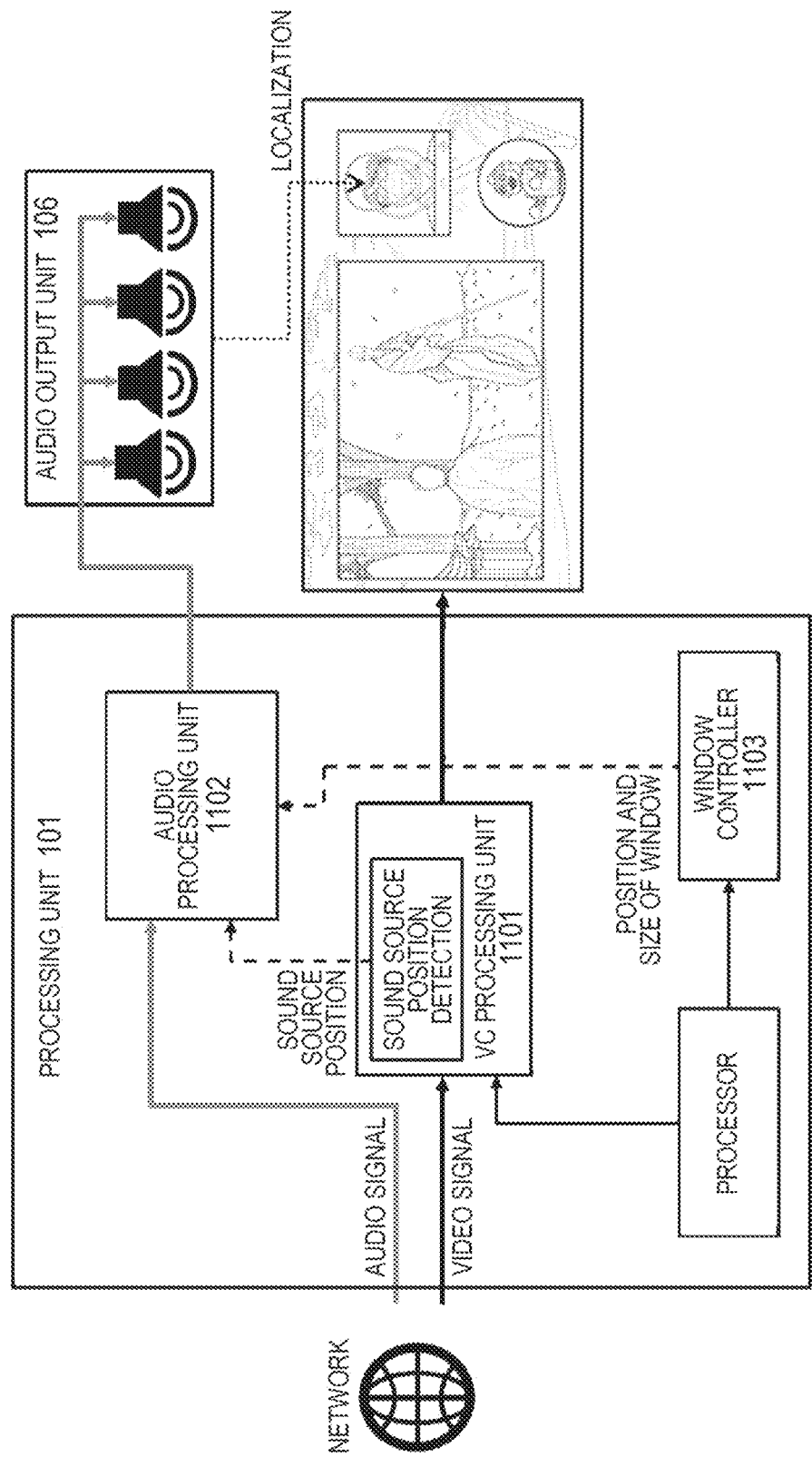
FIG. 11 is a diagram showing a functional configuration for performing processing of matching a sound image with an image in visual communication.

FIG. 11 schematically shows a functional configuration for performing a process of matching a sound image with an image in visual communication. However, each functional module shown in FIG. 11 is basically implemented in the processing unit 101. Furthermore, it is assumed that the communication signal for visual communication received by the communication unit 103 is demultiplexed into video and audio, further decoded for each of the video signal and audio signal, and then input to the processing unit 101.

When the decoded video signal is input, a visual communication (VC) processing unit 1101 performs display processing of the video of the video conference. Here, in a case where visual communication is performed by multipoint communication, the visual communication processing unit 1101 divides the screen of the display unit 104 (or a window area allocated to the visual communication) into a plurality of areas, and executes processing for displaying and outputting (that is, allocating the divided area to each point) the video conference video shot at another point in each divided area. Furthermore, when the total number of divided areas is smaller than the number of connected points, the visual communication processing unit 1101 switches the screen of each divided area. For example, in a case where a video of the point where the order of remarks has come around or the point where the initiative is newly held is hidden, the video is switched to a video of another point currently displayed. The video signal processed by the visual communication processing unit 1101 is once written to the visual communication plane in a video memory (not shown in FIG. 11), and is then superimposed on the image information of the other planes, and is displayed and output on the screen of the display unit 104.

The visual communication processing unit 1101 detects a position of the sound source included in the video frame. The sound source is a speaker such as a video conference participant taken in the video. The visual communication processing unit 1101 detects the sound source by detecting a face position of the conference participant in the video frame by, for example, face detection processing. Furthermore, in a case where visual communication is performed by multipoint communication described above, the visual communication processing unit 1101 detects the divided area displaying the video of the point currently being spoken as the position of the sound source.

When the audio processing unit 1102 inputs the decoded audio signal, the audio processing unit 1102 outputs the audio using the plurality of speakers included in the audio output unit 106. In a case where the position information of the sound source is given from the visual communication processing unit 1101, the sound image is localized at the position of the sound source, and the audio is output from the audio output unit 106. In a case where visual communication is performed by multipoint communication (described above), the audio processing unit 1102 localizes the sound image in the divided area displaying the video of the point where the audio is currently being spoken.

In a case where the video of visual communication is displayed in full screen on the display unit 1104, the audio processing unit 1102 converts the sound source position detected by the visual communication processing unit 1101 into information on the display position on the screen to localize the sound image. In a case where visual communication is performed by multipoint communication, the sound image is localized in the divided area where the video of the point where the person is currently speaking is being played.

In a case where the multi-window is applied to the screen of the display unit 104, if the audio processing unit 1102 acquires the information on the display position and size of the window allocated to the visual communication from the window controller 1103, the sound source position detected by the visual communication processing unit 1101 is converted into the position in the window, information on the display position of the sound source on the screen is obtained by adding the display position (offset) of the window to the converted position, and the sound image localization is performed. In a case where visual communication is performed by multipoint communication, the sound image is localized in the divided area where the video of the point where the person is currently speaking is being played, within the window.

(3) In Case of Graphics

The sound source of the audio agent is the video of the audio agent itself. Therefore, the position of the sound source can be detected by acquiring a display position of the audio agent from a graphics processing unit that generates the video of the audio agent. Furthermore, in a case where the user moves in the room and the audio agent follows and moves in the large screen, the position of the sound source is detected on the basis of position information of the user. Then, every time the audio agent speaks, the audio signal processing is performed so that a sound image of composited audio of the audio agent is localized at the display position of the audio agent, and the audio is output from the audio output unit 106.

Figure 12:
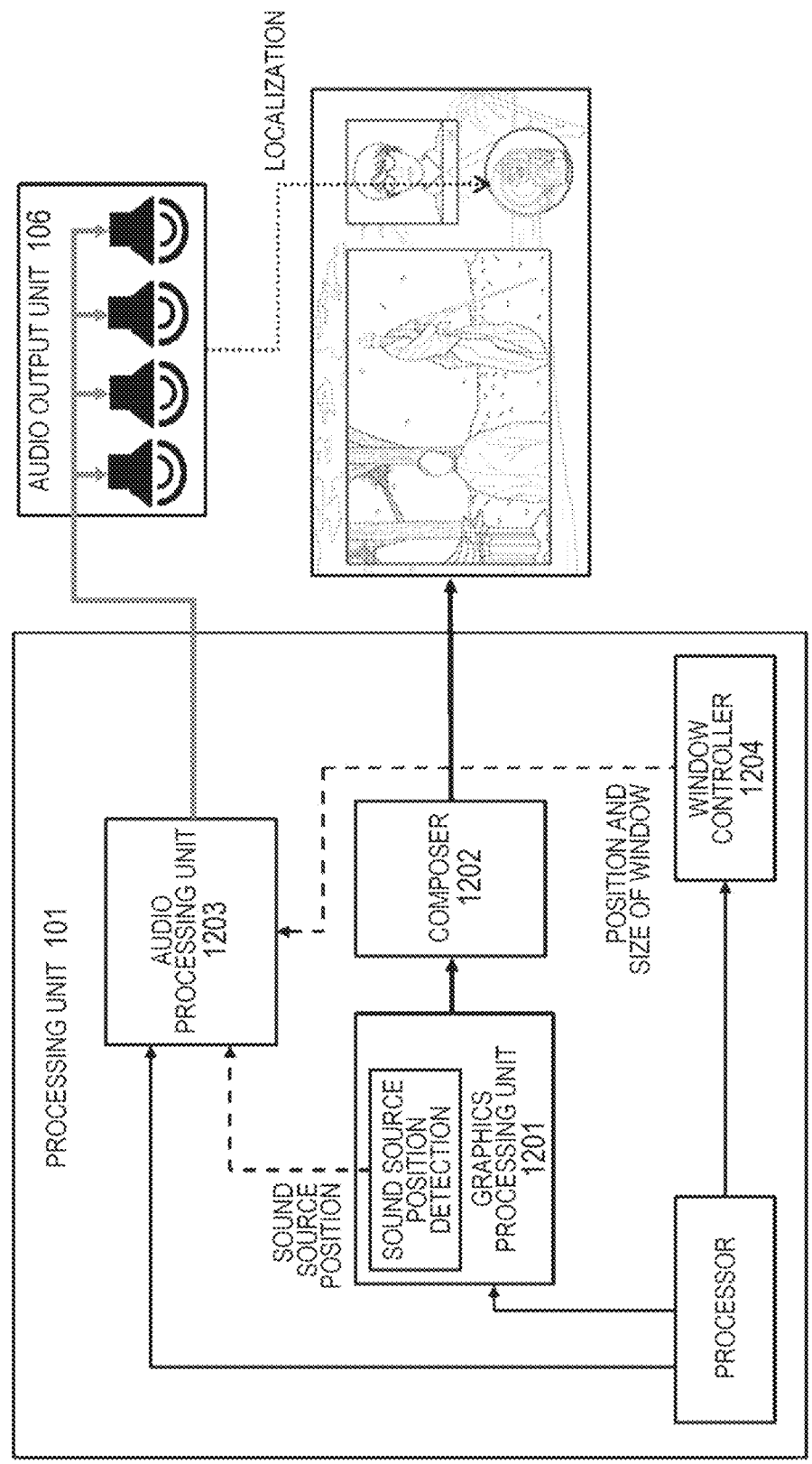
FIG. 12 is a diagram showing a functional configuration for performing processing of matching a sound image of an audio agent with an image.

FIG. 12 schematically shows a functional configuration for performing processing of matching a sound image of an audio agent with an image. However, each functional module shown in FIG. 12 is basically implemented in the processing unit 101.

In the present embodiment, it is assumed that an application for the audio agent is installed in the information device 100, in advance. In the processing unit 101, such an application is executed to display the graphics (e.g. animation character) of the audio agent on the screen of the display unit 104, or an audio message from the audio agent is output from the audio output unit 106. However, it is assumed that the information device 100 uses an external agent service instead of executing the application for the audio agent in the information device 100. In this case, the information device 100 uses the communication unit 103 to utilize interactive processing by an external agent service, and exclusively performs only audio input/output and graphics display of the audio agent on the information device 100.

The graphics processing unit 1201 is on the basis of a dialogue processing result executed by a processor in the processing unit 101 (or on the basis of a dialogue processing result received from the external agent service via the communication unit 103), and generates graphics for the character of the audio agent. Then, a composer 1202 composes an animation of the generated character. An image of the composed character animation is once written to a graphics plane in a video memory (not shown in FIG. 12), is then superimposed on the image information of the other planes, and is displayed and output on the screen of the display unit 104.

Furthermore, the graphics processing unit 1201 outputs information regarding a position for displaying the graphics of the audio agent on the screen of the display unit 104 to the audio processing unit 1203.

The audio processing unit 1203 performs audio composition for a message (text) of the audio agent generated by the processor (or an external agent service) in the processing unit 101, and uses the plurality of speakers included in the audio output unit 106 to output the audio. As described above, in a case where the information on the display position of the audio agent is given from the graphics processing unit 1201, the audio processing unit 1203 localizes the sound image at the display position, and outputs the audio of the audio agent from the audio output unit 106.

Next, a case where the information device 100 functions as an agent device will be described.

Figure 3:
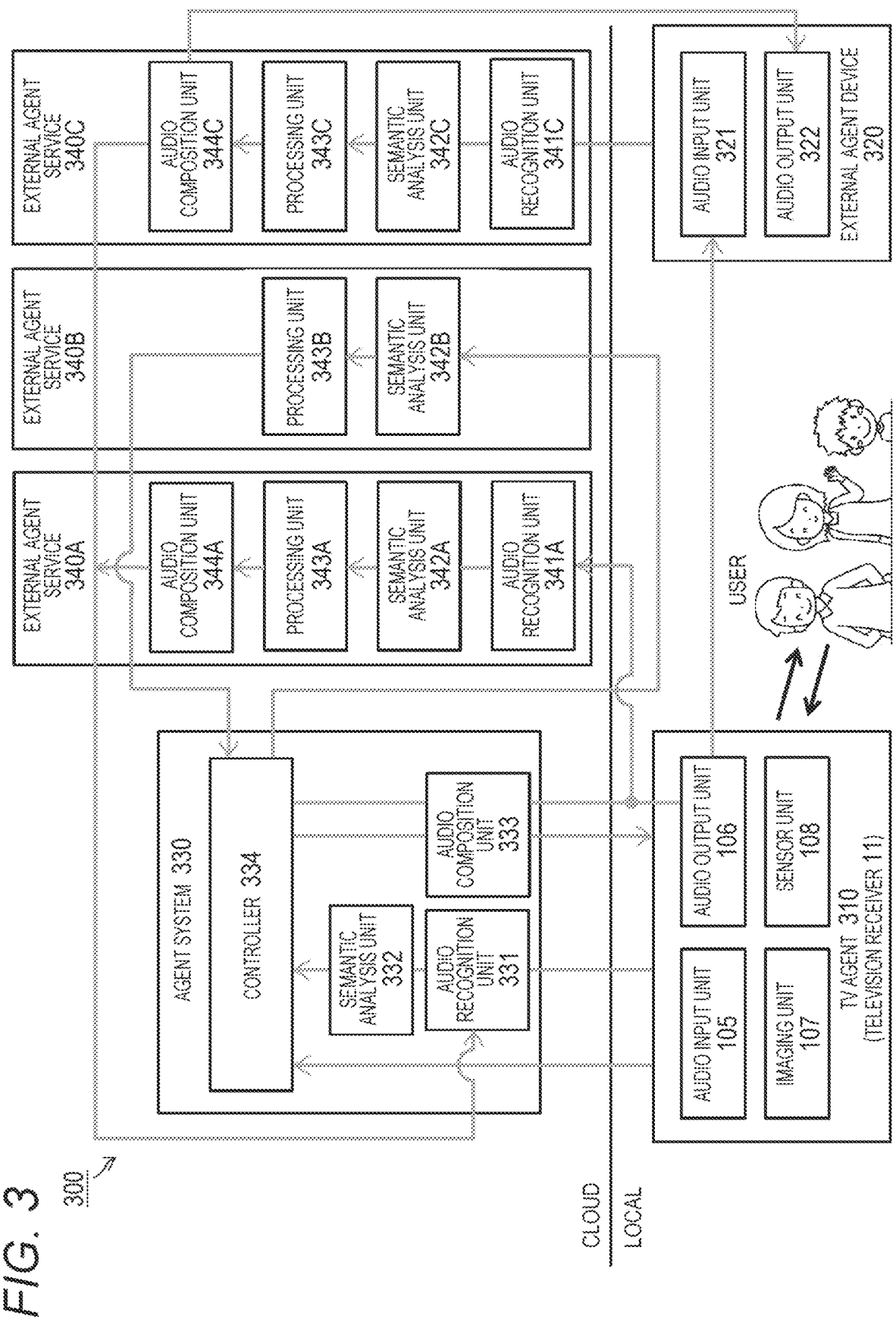
FIG. 3 is a diagram schematically showing a configuration example of an agent cloud platform using a cloud.

The agent function is generally provided by a link between an agent device installed around the user and an agent service built on a cloud. FIG. 3 schematically shows a configuration example of an agent cloud platform 300 using a cloud. The agent cloud platform 300 is divided into a local side and a cloud side.

The local side of the agent cloud platform 300 corresponds to the living room 1 shown in FIG. 1 and the like, and includes a TV agent 310 and an external agent device 320.

The TV agent 310 is an agent incorporated in the information device 100 (corresponding to the television receiver 11 in FIG. 1), and can utilize each functional module such as the audio input unit 105, the audio output unit 106, the imaging unit 107, and the sensor unit 108 provided in the information device 100.

The external agent device 320 corresponds to the agent device 12 in FIG. 1. The external agent device 320 is a device dedicated to an audio agent, and includes an audio input unit 321 and an audio output unit 322 for interacting with a user. However, the external agent device 320 is not limited to the device dedicated to the audio agent, which is also called "smart speaker", "AI speaker", "AI assistant", etc., and may be an audio agent incorporated in a CE device other than the television receiver 11, an IoT device, an information terminal, or the like.

Both the TV agent 310 and the external agent device 320 are certainly, for the user, agents that conduct audio-based dialogues. However, in the present embodiment, the former is called a "TV agent" because it interacts with the user via the television receiver 11 (or provides an agent service that has a high affinity with a TV), the latter is called an "external agent device" because it interacts with the user outside the television receiver 11 (or provides an agent service that has little connection with the TV broadcasting service), and the two are distinguished for convenience.

On the other hand, the cloud side of the agent cloud platform 300 includes an agent system 330 and a plurality of external agent services 340A, 340B, 340C, . . . . From the user's point of view, the agent system 330 and the external agent services 340A, 340B, 340C, . . . are all not different, in terms of providing the agent service that answers inquiries from the user of the local side. However, the former is called an "agent system" because it provides the agent service in a direct link with the TV agent 310, the latter is called "external agent service" because it does not directly link with the TV agent 310 and provides the agent service from the outside of the television receiver 11, and the two are distinguished for convenience. The agent system 330 may be built on a server device operated by, for example, a product manufacturer or a distributor of the television receiver 11, but is not limited to a specific operation form. Furthermore, at least a part of the external agent services 340A, 340B, 340C, . . . (the external agent service 340C in the example shown in FIG. 3) is directly linked to the external agent device 320 installed on the local side.

The agent system 330 includes an audio recognition unit 331, a semantic analysis unit 332, an audio composition unit 333, and a controller 334.

The audio recognition unit 331 performs audio recognition of the user's utterance collected by the audio input unit 105 on the TV agent 310 side and converts the recognized utterance into text information. The semantic analysis unit 332 performs a semantic analysis of user's utterance data on the basis of the text information recognized by audio. Furthermore, the audio composition unit 333 converts text information, which is an answer to the user, into audio data. The audio data is transmitted to the TV agent 310 and is audio-outputted from the audio output unit 106 to the user who made an inquiry. Note that the TV agent 310 may output the answer to the inquiry from the user by using the video output of the screen of the display unit 104, in addition to the audio output. Furthermore, the TV agent 310 may output the answer to the inquiry from the user by also using the output function of the other CE device or IoT device connected to the television receiver 11 via the home network.

The controller 334 executes processing for answering the inquiry from the user of the TV agent 310. For example, in order for the controller 334 to answer the inquiries from the user by, for example, searching for information inquired by the user, acquiring the content requested by the user, and placing an order for a product, the controller 334 may be equipped with a learning function and an artificial intelligence (AI) function.

Furthermore, the controller 334 can further call the external agent services 340A, 340B, 340C, . . . to answer the inquiry from the user. The controller 334 may call all the external agent services 340A, 340B, 340C, . . . which can be requested, or may select and call some of the external agent devices. For example, in a case where each of the external agent services 340A, 340B, 340C, . . . has its own specialty field, the controller 334 may select the external agent service of a request destination according to the content of the inquiry from the user, profile information of the inquired user, and the like. Furthermore, when the user inputs a "start word" that specifies a specific external agent service by audio, the controller 334 may make a request to the external agent service corresponding to the input start word as it is, or may select the external agent service of the request destination while considering the start word.

Furthermore, there are several possible methods to call the external agent services 340A, 340B, 340C, . . . from the agent system 330. For example, the text information obtained by the semantic analysis of the inquiry from the user by the semantic analysis unit 332 may be transmitted to the external agent service 340B, or the audio data obtained by audio-compositing the text information by the audio composition unit 333 may be transmitted to the external agent service 340A to make an inquiry in the form of audio input from the user. Alternatively, in a case where the agent system 330 makes a request to the external agent service 340C, it is also possible that the audio data audio-composited by the audio composition unit 333 is transmitted to the TV agent 310, the audio output unit 106 of the TV agent 310 outputs the audio as if the user in the room inquires, thereby, making an inquiry through the external agent device 320.

Furthermore, there are also some possible methods of responding to the agent system 100 from the external agent services 340A, 340B, 340C, . . . of the request destination. For example, like the external agent service 340B, the processing result including the text information (or before audio composition) may be transmitted to the agent service 330. Furthermore, the audio data obtained by audio-compositing the processing result may be transmitted to the agent service 330, like the external agent services 340A and 340C. The agent service 330 further includes an audio recognition unit 331 for audio recognition of the audio data transmitted from the external agent services 340A, 340C, etc., and a semantic analysis unit 332 for semantically analyzing the audio recognition result.

Then, the controller 334 aggregates the answers from each of the external agent services 340A, 340B, and 340C at the level of the semantic analysis result, and generates an answer sentence to the inquiry from the user. The method of aggregating a plurality of answers is arbitrary. An answer from a specific external agent service may be selected after comparing with the answer obtained by the agent system 330 itself, an answer from the specific external agent service may be selected on the basis of a predetermined selection criterion such as a majority vote, or answers from a plurality of external agent services may be composited to generate one answer sentence. In any case, the audio composition unit 333 converts the answer sentence generated by the controller 334 into audio data and transmits the audio data to the TV agent 310. Then, in the TV agent 310, the audio of the answer to the user who made the inquiry is audio-outputted from the audio output unit 106 to the user.

Note that a part or all of the function modules of the audio recognition unit 331, the semantic analysis unit 332, the audio composition unit 333, and the controller 334 included in the agent system 330 may be incorporated into the TV agent 310. Alternatively, these functional modules 331 to 334 may be built on one server device, or may be distributed and arranged in a plurality of server devices.

The functional configurations of the external agent services 340A, 340B, 340C, . . . are almost the same. The functional configuration of the external agent service 340C will be described below as a representative.

The external agent service 340C includes an audio recognition unit 341C, a semantic analysis unit 342C, a processing unit 343C, and an audio composition unit 344C.

The audio recognition unit 341C performs audio recognition for an utterance collected by the audio input unit 321 of the external agent device 320 and converts the recognized utterance into text information. Note that the audio collected by the audio input unit 321 may be audio output from the audio output unit 106 of the TV agent 310, in addition to the user's utterance.

The semantic analysis unit 342C performs semantic analysis of user's utterance data on the basis of the text information recognized by audio. The processing unit 343C executes processing for answering an inquiry from the user. For example, if the semantic analysis result reveals that the "start word" designating the external agent service 340C is audio-inputted from the user, the processing unit 343C starts processing execution.

The audio composition unit 344C converts text information, which is an answer to the user, into audio data. The audio data is transmitted to the external agent device 320, and is audio-outputted from the audio output unit 322 to the user who made the inquiry. Note that it is assumed that the audio data generated by the audio composition unit 344C is transmitted to the external agent device 320 and is audio-outputted, and is also transmitted to the agent system 330 and is inputted to the audio recognition unit 331.

Note that, in FIG. 3, for simplification of the drawing, one agent system 330 on the cloud side is drawn to provide the agent service to one TV agent 310; however, it is assumed that one agent system 330 simultaneously provides agent services to a plurality of TV agents incorporated on a plurality of television receivers. That is, in reality, one agent system 330 simultaneously provides the agent service to the TV agents of many television receivers installed in each home.

Furthermore, although three external agent services 340A, 340B, and 340C are illustrated in FIG. 3, the number of external agent services that are linked with the agent system 330 is not limited to three, and it is assumed to link with two or less or four or more external agent services.

Furthermore, although one external agent device 320 is illustrated in FIG. 3, the external agent device is not necessarily an essential component for implementing the technology disclosed herein. Alternatively, it should be understood that even if two or more external agent devices coexist on the local side, the technology disclosed herein can be similarly realized.

Among the plurality of agent services shown in FIG. 3, the external agent services 340A, 340B, and 340C are also called, for example, "AI agents" and are services that are already widely used at the time of filing the present application. This type of external agent service is supposed to have a myriad of external agent devices (corresponding to the external agent device 320 in FIG. 3) that can be connected via a wide area network such as the Internet. Each user can log in to the external agent service through their own external agent device. Each external agent service sets an account for each logged-in user, and manages profile information and history information of each user in association with the account (hereinafter, also referred to as "account switching" function). Then, the external agent service can provide a customized or personalized fine-grained service to individual users by sequentially updating profile information and history information or incorporating a learning function, for example, each time an inquiry is received from the user.

Furthermore, among the plurality of agent services shown in FIG. 3, the agent system 330 is assumed to be operated by, for example, a product manufacturer or a distributor of the television receiver 11, and is directly linked with the TV agent 310 to provide the agent service. It is certain that the agent system 330 is also an AI agent, but the user of the TV agent 310 is basically limited to the user who watches the television receiver 11. The agent system 330 specifies the user on the basis of the result of recognizing and identifying a person by recognizing the image or audio captured by the imaging unit 107 or the audio input unit 105 of the television receiver 11 (that is, the local side), and manage accounts for each user. Then, the agent system 330 can provide customized or personalized fine-grained services to individual users by updating the profile information and history information of each user or incorporating a learning function, each time an inquiry is received from the user, or on the basis of the detection result by the sensor unit 108 (which may include the imaging unit 107 and the audio input unit 105).

Note that although, in the agent cloud platform 300 shown in FIG. 3, the agent system 330 is configured to be directly linked with the TV agent incorporated in the television receiver 11, the type of device with which the agent system 330 can be directly linked is not limited to the television receiver. For example, a modified example is also assumed in which an agent incorporated in various information devices such as information terminals that can be carried by users such as smartphones and tablets, wearable devices worn by users, various CE devices such as air conditioners, recorders, and washing machines, IoT devices, interactive robots, and car navigation systems installed in cars, is directly linked with the agent system 330. Furthermore, in a case where the agent system 330 is linked with a device other than the television receiver, the external agent device 320 may be an audio agent incorporated in the television receiver.

Here, the use cases assumed in the TV agent 310 are summarized.

First, it is assumed that the TV agent 310 operates in the living room 1 in which the television receiver 11 is installed in a situation where a plurality of families is watching TV together as shown in FIG. 1. In the example shown in FIG. 1, there are three people, specifically, parents and a child; however, a family of four or more may be in the living room 1. Furthermore, it is also assumed that each person can move freely indoors and outdoors.

Here, the room (living room 1) in which the TV agent 310 operates is not limited to a simple shape such as a square, and the shape of the room is further complicated by the installation of furniture such as tables and sofas and various objects such as foliage plants. When controlling a sound field of the TV Agent 310, not only the shape of the room, but also the arrangement of furniture, the material of the furniture, the room temperature, the environmental sound, and the situation of people in the room also affect.

Furthermore, in an environment in which the TV agent 310 operates, such as the living room 1, there is a plurality of speakers linked to the television receiver 11. "Link" means that it can be used not only for audio output of the content of the television receiver 11, but also for audio output of the TV agent 310. By using two or more speakers, the sound field of the TV agent 310 can be generated. Wavefront composition technology may be used to generate the sound field. Wavefront composition is a technology for spatially compositing each wavefront by appropriately controlling the phase, amplitude, etc. output from the plurality of speakers, and can control sound image localization and perform area control of audible and inaudible areas in a room. By increasing the number of speakers, the resolution of sound image localization or area control can be increased.

Figure 4:
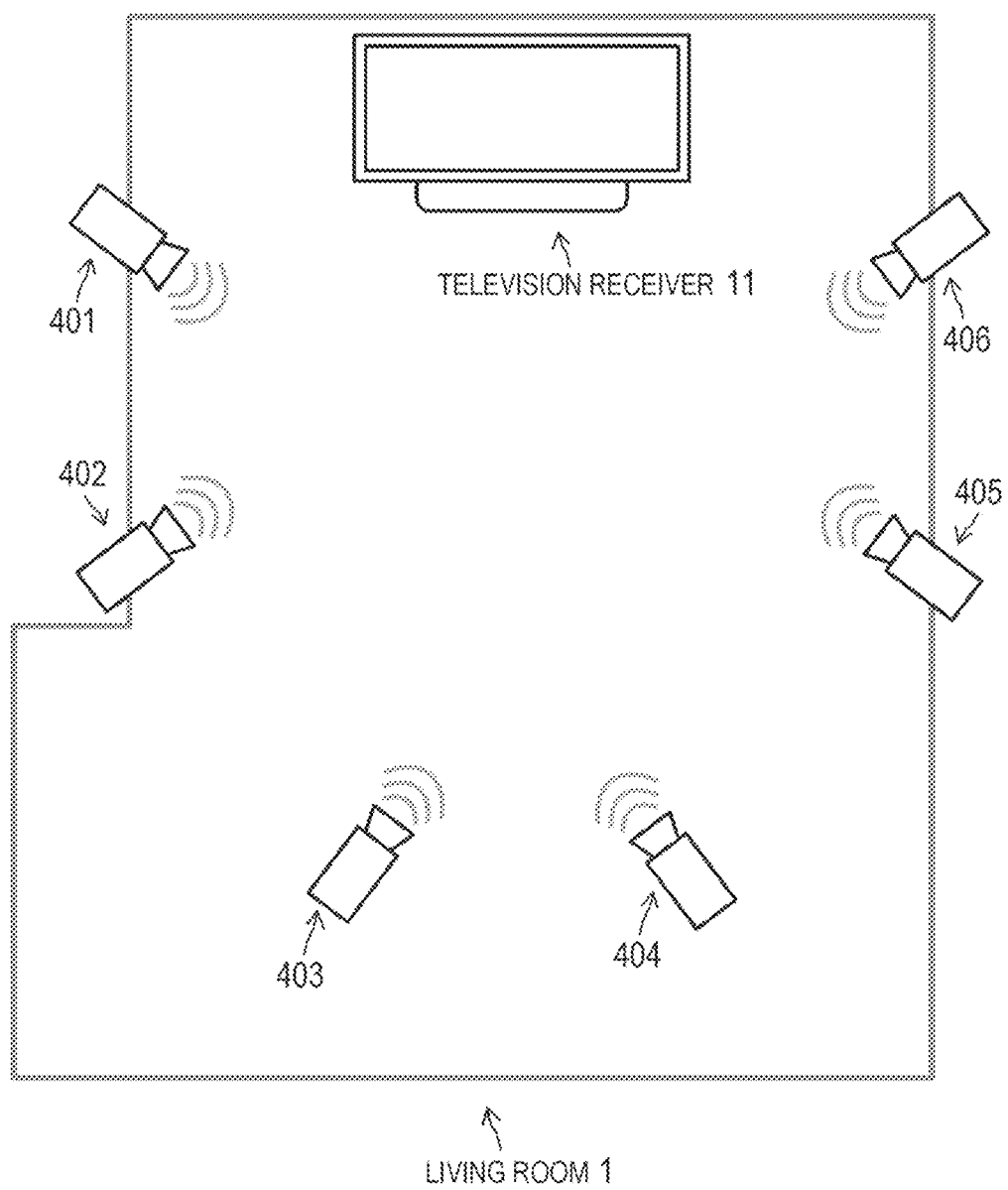
FIG. 4 is a diagram showing an example in which a plurality of speakers linked with a television receiver is distributed and arranged in a room.

For example, by mounting the flat panel type speaker (described above) on the television receiver 11, the number of linked speakers can be increased (see FIG. 9). In addition to the speakers incorporated in the television receiver 11 such as the flat panel speakers (or instead of the incorporated type speakers), one or more speakers externally connected to the television receiver 11 may be used. Furthermore, in order to enable uniform sound image localization in the room without density, it is preferable to distribute and arrange the plurality of speakers. FIG. 4 shows an example in which a plurality of speakers 401 to 406 linked with the television receiver 11 is distributed and arranged in the room. Furthermore, although not shown, it is still preferable if the speakers can be arranged in a three-dimensional space in a distributed manner by installing some speakers on the ceiling or in an upper position near the ceiling.

Furthermore, various sensors are arranged in the environment in which the TV agent 310 operates, such as the living room 1. For example, these are the sensor unit 108 provided in the information device 100 as the television receiver 11, and the sensors externally connected or wirelessly connected to the television receiver 11. For details of the sensor unit 108, refer to the above. Moreover, the sensor devices incorporated in furniture such as room walls, ceilings, floors, sofas and tables may communicate with the television receiver 11 to allow the TV agent 310 to use sensor information collected from the room. The sensor device includes a memory that stores attribute information, and transmits sensor information with attribute information such as the size and weight of a furniture material, for example.

Furthermore, in FIG. 1, for the sake of simplification of the drawing, only one TV agent is illustrated, but it is also assumed that one television receiver 11 is equipped with a plurality of audio agents. Among the plurality of TV agents, agent applications that are linked with the external agent services are also included. The TV agent 310 has a function of coexisting with other audio agents.

The television receiver 11 plays back and outputs a broadcasting content selected and received, and a content streamed by an OTT service. Then, the television receiver 11 shall play back and output the audio of the content at a loud volume. Furthermore, various objects such as entertainers such as performers of programs and products are displayed on the screen. The user is assumed to inquiry the TV agent 310 for information regarding the display object.

Furthermore, the TV agent 310 can use the detection signals of the sensor unit 108 provided in the information device 100 as the television receiver 11, and the sensors (described above) externally connected or wirelessly connected to the television receiver 11. Therefore, the TV agent 310 can recognize information regarding the indoor environment such as the user's whereabouts and movements, gestures made by the user, and the installation position of each piece of furniture by collecting sensor information from the sensor unit 108 in the television receiver 11 or the sensors in the room.

First Example

The TV agent 310 can provide the user with audio services similar to the external agent device 330, such as: answers to questions from the user by voice concerning, for example, weather forecasts, stock/exchange information, or news; accepting product orders; reading out the contents of purchased books; and turning on/off and adjusting operations of home appliances such as lights and air conditioners.

Furthermore, the TV agent 310 can provide a user interface (UI) for general operations on the television receiver 11, including operations in the device 100 such as channel selection, volume adjustment, recording, and image quality adjustment on the television receiver 11, and operations related to content playback. Regarding the playback of the content, in addition to the content recorded by the television receiver 11, an operation related to the playback of the streaming content provided by the OTT service shall be included.

Moreover, in the present embodiment, the TV agent 310 realizes interaction with an application linked to the content being played back. The application referred to herein includes broadcasting applications linked to broadcasting programs being on the air, or OTT applications.

According to the function of such interaction, the TV agent 310 can answer an inquiry from the user regarding the content of the content being played back (program content being on the air or being streamed). Therefore, the user can request information related to the contents of the program, such as performers or BGM, from the TV agent 310 in real time without interrupting the content playback.

With the user interface of the conventional (or general configuration) TV remote controller, it is possible to perform operations on the television receiver 11 such as playing back the content or adjusting the volume, it is difficult to operate an application linked to the content being played back. On the other hand, in the present embodiment, the TV agent 310 can equip with the function of interacting with the application linked to the content and, thereby, the user can acquire information related to the content being played back on the air or being played back via the TV agent 310 in real time without interrupting the content playback.

The interaction between the TV agent 310 and the application linked to the content being played back is realized by linking the application linked to the content playback with a server broadcasting application on a server broadcasting application server side. The application linked to the content being played back can directly communicate with the broadcasting application server. Furthermore, the application linked to the content being played back can communicate with the agent system 330 as a server of the TV agent 310 via an application program interface (API) of the television receiver 11.

A mechanism for realizing the UI related to the interaction with the application linked to the content being played back by the TV agent 310 will be described with reference to FIG. 5.

As a premise, a broadcasting station 501 distributes the contents of the broadcasting program and control information related to the broadcasting application (hereinafter, also referred to as "application control information"). The television receiver 11 can select a broadcast wave and receive a broadcasting program content and application control information. Furthermore, on the television receiver 11, the received content is played back, and an application 503 linked to the content being played back is executed.

(Step 1) First, the TV agent 310 registers, in advance, a broadcasting application server 502 of the application linked to the broadcasting content on the air.

(Step 2) The user operates an application linked to the content being broadcasted on the television receiver 11. At this time, the application 503 linked to the content being broadcasted acquires identification information, such as a personal identification number (PIN), from the broadcasting application on the server 502 side and presents the PIN to the user of the TV agent 310. The application linked to the content being broadcasted may, for example, superimpose and present the PIN on the screen of the broadcasting program, and may superimpose and present an audio message notifying the PIN on the audio signal of the broadcasting program. At that time, it is preferable to present the PIN so as not to overlap with the performers and audio of the broadcasting program.

(Step 3) The user requests the TV agent 310, for example, by voice, to have the PIN be activated for the content being broadcasted.

(Step 4) In response to an audio inquiry from the TV agent 310, the application 503 that links with the content being broadcasted and the broadcasting application on the server 502 side are linked.

After the application linked to the content being broadcasted and the broadcasting application on the server 502 side are linked, the TV agent 310 can interact with the application linked to the content being played back. It is not necessary to repeat the steps 1 to 3 described above for each interaction.

For example, it is assumed that the user requests the TV agent 310 by audio for information related to the content of the program such as the performers or BGM.

The TV agent 310 transmits the collected audio data to the agent system 330. Then, the agent system 330 performs audio recognition and semantic analysis of the user's audio data received from the TV agent 310, and requests the broadcasting application server 502 for the information requested by the user.

The broadcasting application server 502 is already linked with the application 503, which is running on the television receiver 11 and is linked to the content being broadcasted. The broadcasting application server 502 requests the information requested by the agent system 330 from the application linked to the content being broadcasted.

In a case where the requested information is transmitted in the data broadcasting accompanying the broadcasting content, the application 503 linked to the content being broadcasted can decode this type of data broadcasting and acquire the requested information. Alternatively, the application linked to the content being broadcasted may perform data analysis of the video or audio of the broadcasting content to acquire the information requested by the user.

Then, the application 503 linked to the content being broadcasted returns the requested information such as the performers or BGM of the program being broadcasted. At this time, the application 503 linked to the content being broadcasted may return the information to the agent system 330 via the broadcasting application server 502, or may return the information to the agent system 330 via the API of the television receiver 11.

The agent system 330 generates an answer to the user on the basis of the information returned from the application linked to the content being broadcasted, performs audio composition for the answer, and transmits the audio composition result to the TV agent 310. Then, the TV agent 310 outputs a response message to an inquiry from the user, such as the performers or BGM of the program being broadcasted, by audio. In the case of an agent service that displays the video (e.g. avatar) of the TV agent 310 on the television screen, it is possible to prevent the user from feeling uncomfortable by localizing the sound image of the audio of the TV agent 310 at the display position of such a video. Furthermore, for the sound field generation of the TV agent 310, a wavefront composition technique for spatially compositing each wavefront by appropriately controlling the phase, amplitude, etc. output from the plurality of speakers may be used. In order to realize wavefront composition, the flat panel type speaker (see FIG. 9) incorporated in the screen of the display unit 104 may be used for the audio output unit 106, as the audio output unit 106.

Note that it is assumed that the TV agent 310 not only interacts in response to an inquiry from the user, but also interacts independently. The TV agent 310 uses, for example, an AI function to change the degree of interest in the content for each content to be played back, for each chapter of the content being played back, or for each scene. Then, when the degree of interest in the content increases, the TV agent 310 uses the function described above to collect information regarding the content being played back and autonomously conducts a conversation with the user. On the other hand, when the degree of interest in the content decreases, the TV agent 310 reduces the frequency of conversation with the user or becomes silent.

Figure 5:
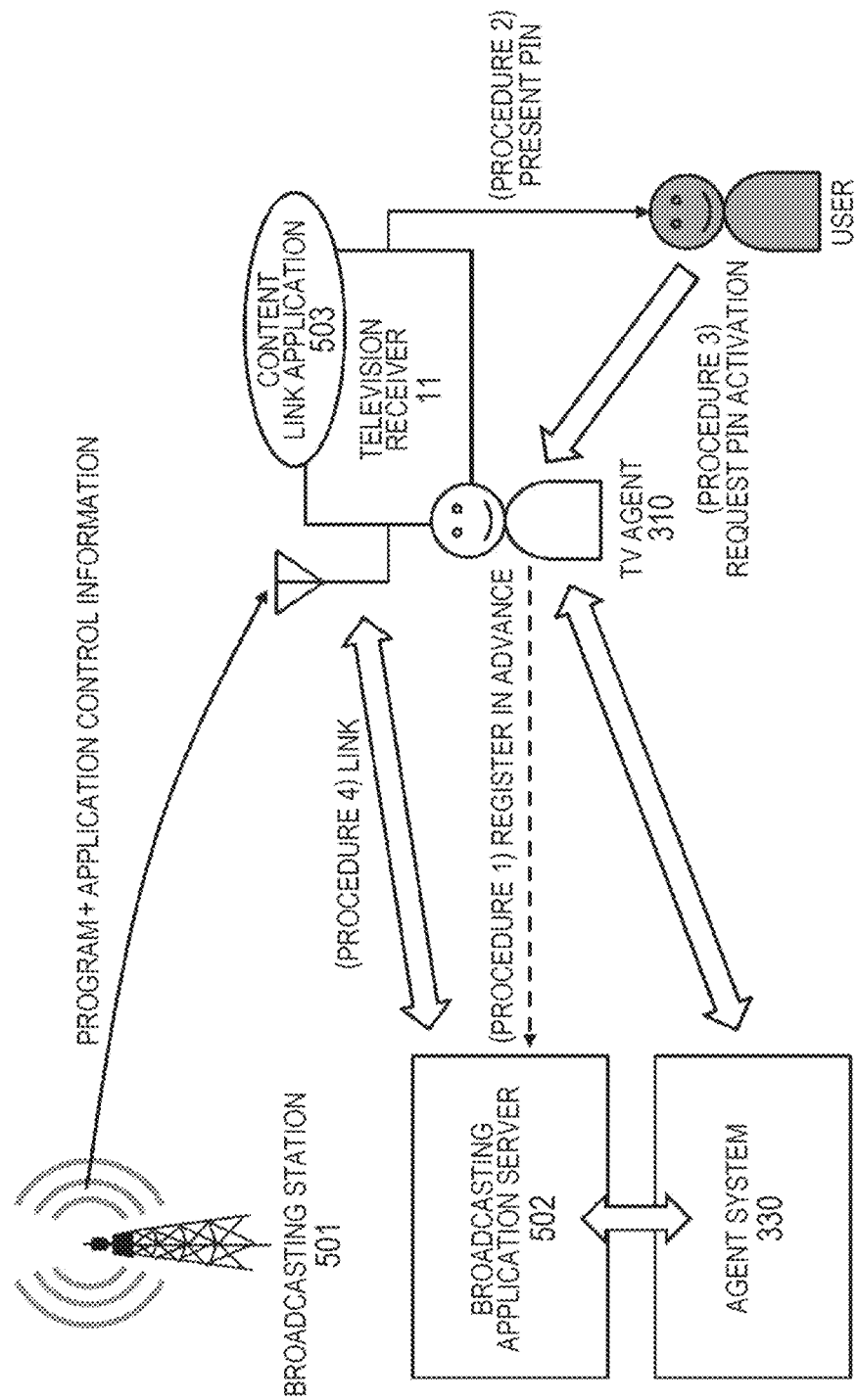
FIG. 5 is a diagram for explaining an operation example of a TV agent.

FIG. 5 shows an example in which the TV agent 310 interacts with the application 503 linked to the content being played back. Of course, the application of the external agent device 320 can also realize the interaction with the application linked to the content being played back on the television receiver 11 through the external agent service 340, with the same mechanism as described above.

Furthermore, although FIG. 5 shows the mechanism in which the TV agent 310 interacts with the application linked with the broadcasting content, the TV agent 310 can similarly interact with various applications other than the broadcasting application, including the application of the OTT service. Of course, not only the TV agent 310 but also the application of the external agent device 320 can similarly interact with various applications other than the broadcasting application, including the application of the OTT service.

Second Example

In a case where the TV agent 310 incorporated in the television receiver 11 implements an audio service, there is a problem that the audio of the TV broadcasting and the audio of the audio UI of the TV agent 310 are mixed, which makes it difficult for the user to hear. Note that a similar problem may occur when the audio agent is incorporated in an acoustic output device such as a music player. Furthermore, in the case of the agent service that displays the video (e.g. avatar) of the TV agent 310 on the television screen, if the audio is heard from a place different from the display position of such a video, there is a concern that it may give the user a sense of uncomfortable.

Furthermore, in a situation where the television receiver 11 is installed in the living room 1 (see FIG. 1), it is assumed the TV agent 310 will deal with a plurality of users, such as a family of a plurality of people. The TV agent 310 may interact with only some of the users, not all of the users. For example, this is a case where the TV agent 310 responds to a request received from one user, or the TV agent 310 limits the user to some of the users and performs an independent interaction. For other users who did not make the request or for users who were excluded from an interaction target, the audio service of the TV agent 310 is an obstacle, and there is a problem that it is difficult to hear the audio of the TV broadcast.

Furthermore, in a case where one television receiver 11 is equipped with an audio agent other than the TV agent 310, there is a problem that it is difficult for the user to identify which agent the audio service is provided by. In a case where a plurality of audio agents is linked with different agent services, it is assumed that the audio services of each other may overlap and become difficult to hear. A similar problem can occur in a case where a plurality of audio agents is mounted on the information device other than the television receiver.

In the present embodiment, by introducing the sound field generation technology represented by the wavefront composition, the mixing of pieces of audio (or interference between the pieces of audio) described above is avoided, and distinctiveness of the pieces of audio of the TV agent 310 is ensured. Wavefront composition is a technology for spatially compositing each wavefront by appropriately controlling the phase, amplitude, etc. output from the plurality of speakers, and can control sound image localization or perform area control of audible and inaudible areas in a room. For example, it is possible to introduce the wavefront composition technology into the operating environment of the TV agent 310 shown in FIG. 4.

For example, the sound image of the TV agent 310 can be localized to a location away from the television receiver 11, such as the side or above the television screen or the ceiling of the room and, thereby, the user can easily distinguish between the audio of the television broadcasting and the audio of the audio UI of the TV agent 310. Furthermore, when the sound image of the TV agent 310 is localized on the shoulder, ear, or above the head of the user with whom the interaction is made, the user can prevent the audio of the television broadcasting from being mixed with the audio of the audio UI of the TV agent 310 by receiving an impression that something different from the program that was watching is being spoken.

In the case of an agent service that displays the video (e.g. avatar) of the TV agent 310 on the television screen, it is possible to prevent the user from feeling uncomfortable by localizing the sound image of the audio of the TV agent 310 at the display position of such a video. For the sound field generation of the TV agent 310, a wavefront composition technique for spatially compositing each wavefront by appropriately controlling the phase, amplitude, etc. output from the plurality of speakers may be used. In order to realize wavefront composition, the flat panel type speaker (see FIG. 9) incorporated in the screen of the display unit 104 may be used for the audio output unit 106, as the audio output unit 106.

Figure 6:
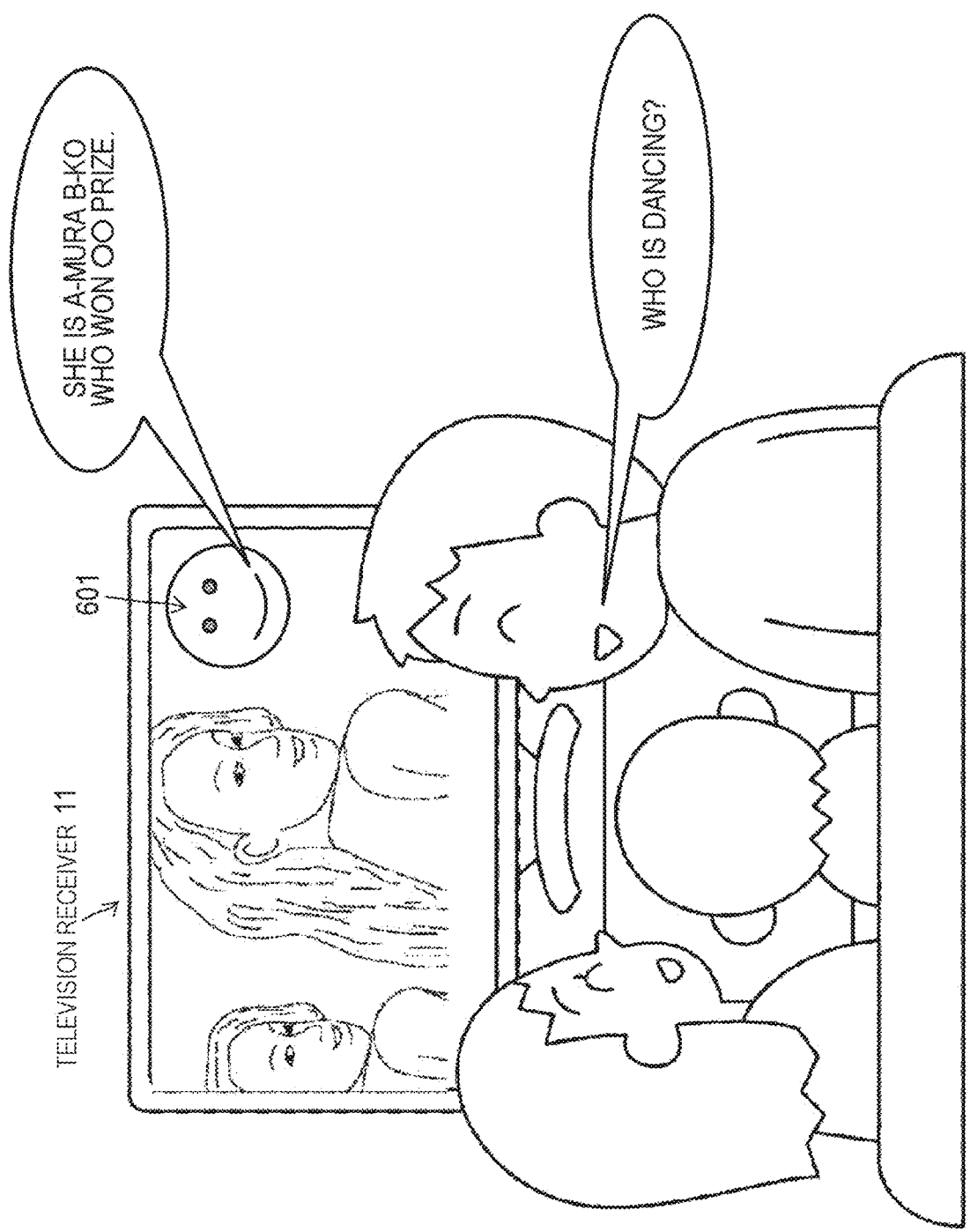
FIG. 6 is a diagram showing an example in which an audio UI of a TV agent 310 is sound-image localized.

In addition, it is preferable to display the video of the TV agent 310 while avoiding the area of interest on the screen of the broadcasting content such as the face of the performer, or to localize the sound image of the TV agent 310 at a position other than the area of interest. FIG. 6 shows an aspect in which the audio UI of the TV agent 310 is localized on the video (e.g. avatar) 601 of the TV agent 310 displayed while avoiding the area of interest (e.g. performers) on the screen of the television receiver 11. Of course, even in a case where the avatar or the like is not displayed on the television screen, it is possible to perform the sound image localization processing while avoiding the area of interest described above. As described above, the sensing results of various sensors are used for the position and attributes of the user in the room. This has the effect of making it easier for the user who uses the audio agent to distinguish between the broadcasting content and the agent audio.

Furthermore, among the plurality of users, the sound image of the TV agent 310 is localized only to the user who is an interaction partner so as not to interfere with the viewing of the television program by other users. According to the wavefront composition technology, since one sound source can be localized in a plurality of places, the sound image is only required to be localized for each user in a case where there are two or more interaction partners. In a case where the user to be the interaction partner and the other user are separately present, area control may be performed so as to generate an area where the audio of the TV agent 310 can be heard and an area where the audio of the TV agent 310 cannot be heard by the wavefront composition. For example, in a case where the interaction with a user sitting on the couch is performed but the interaction with a user at the dining table is not performed, area control is performed on the sound image of the TV agent 310 so that the audio of the TV agent 310 can be heard near the sofa but not near the dining table.

Furthermore, in a case where a plurality of TV agents is mounted on one television receiver 11, the place where the sound image is localized is changed for each TV agent, such as the front, right side, left side, ceiling (or sky), and floor of the television receiver 11, to ensure the distinctiveness. Of course, the tone of the audio UI may be changed for each TV agent.

In addition, in addition to the sound field generation technology (or instead of the sound field generation technology), each TV agent may be equipped with audio collision avoidance technology to prevent audio from being mixed between the TV agents. For example, each TV agent waits for a random backoff time before starting an utterance so as not to interfere with the audio of other TV agents. Alternatively, each TV agent is assigned an utterance priority so that a lower priority TV agent does not interrupt audio of a higher priority TV agent.

Furthermore, in a case where the sound field generation technology is introduced into the TV agent 310, it is preferable to form an optimum environment so that the sound field can be generated according to the theory. However, the sound field is affected by the shape of the room in which the television receiver 11 is installed, the arrangement of furniture, the material of the furniture, the room temperature, the environmental sound, and the situation of people in the room.

Therefore, it is preferable to control the sound field of the audio UI of the TV agent 310 on the basis of, for example, environmental data sensed using the sensor unit 108 equipped in the information device 100 as the television receiver 11, the sensors that are externally or wirelessly connected to the television receiver 11, or even the sensor device that is incorporated in the furniture such as a room wall, a ceiling, a floor, a sofa, or a table.

Furthermore, in some cases, in order for the TV agent 310 to provide the optimal audio service, the user with whom the interaction is made may be urged to change the location in the room or the layout of the room such as the furniture.

Furthermore, even if the user moves by himself/herself according to the recommendation from the TV agent 310 or changes the layout of the room to prepare the environment, it is assumed that the sound field is not improved according to the theory, and an optimum indoor environment for sound field control cannot be calculated from the sensed environmental data. In such a case, the TV agent 310 may acquire information that is insufficient in the sensed environmental data through a dialogue with the user, such as asking a question about how the audio UI is heard. Then, the optimum environment in the room may be recalculated including the information newly obtained through the dialogue to prompt the user to change the layout of the room again.

Figure 7:
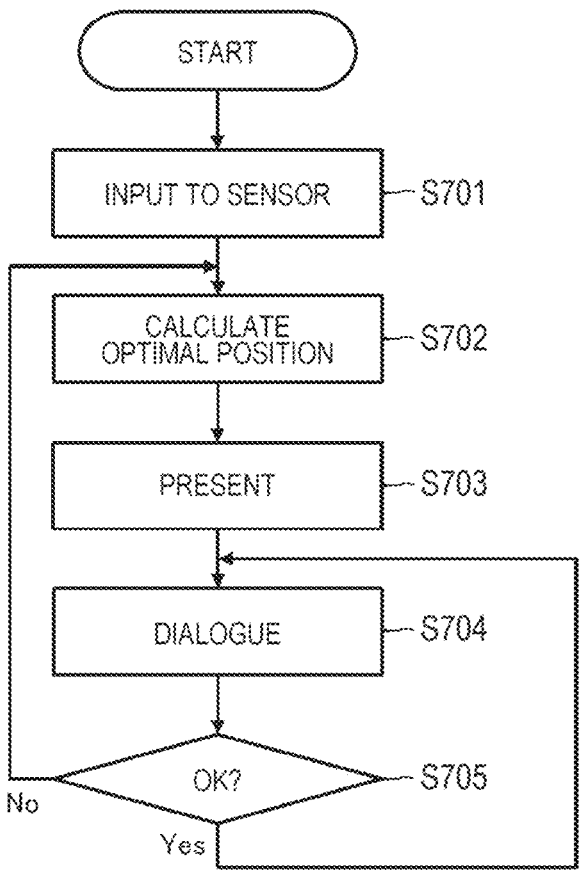
FIG. 7 is a flowchart showing an example of an operation procedure of the TV agent 310.

FIG. 7 shows an example of an operation procedure of the TV agent 310 in the form of a flowchart.

The TV agent 310 collects sensor information from the sensor unit 108 and sensor devices arranged in various places in the room, for example, as a part of the initialization processing (step S701).

Then, the TV agent 310 estimates the structure of the room and the position and material of objects such as furniture installed in the room on the basis of the collected sensor information, calculates the position of the user or furniture, which is optimal for controlling the sound field of the audio UI of the TV agent 310 (step S702), and presents the result to the user (step S703).

The TV agent 310 may present information regarding the optimum arrangement in the room by audio guidance from, for example, the television receiver 11, or may display the information on the screen. In any case, it is preferable to perform the presentation processing so as not to interfere with the viewing of the user.

The user may faithfully change the layout of the room or his/her position as presented by the TV Agent 310, may make only partial changes, or may not change at all.

Thereafter, the TV agent 310 initiates an interaction with the user (step S704). The interaction with the user may be started in response to an inquiry from the user (for example, when the user utters the start word of the TV agent 310), or the TV agent 310 may be the main body to start the interaction. In any case, the TV agent 310 strives to acquire information that is insufficient in the environmental data collected in step S701 by including a dialogue asking how the audio UI is heard in the interaction. Of course, the TV agent 310 may perform a dialogue with the user for the purpose of acquiring missing information, separately from a normal interaction with the user.

Then, the TV agent 310 checks whether a current environment in the room is optimal or within an allowable range for controlling the sound field on the basis of the newly acquired information through the interaction with the user (step S705). If the current environment in the room is optimal or acceptable for controlling the sound field (Yes in step S705), the TV agent 310 continues to interact with the user. On the other hand, if the current environment in the room is not optimal or acceptable for controlling the sound field (Yes in step S705), return to step S702, and the TV agent 310 repeatedly calculates an optimal arrangement in the room and presents the optimal arrangement to the user.

Figure 8:
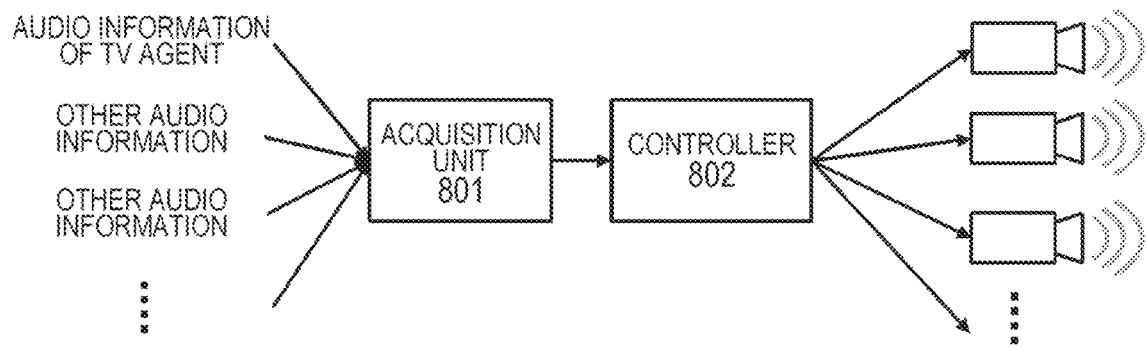
FIG. 8 is a diagram schematically showing a configuration example of a sound field control system 800.

FIG. 8 schematically shows a configuration example of a sound field control system 800 that applies sound field generation technology such as wavefront composition to prevent the audio of an audio agent from being mixed with other audio such as audio of other contents. The illustrated sound field control system 800 includes an acquisition unit 801 and a controller 802. The acquisition unit 801 and the controller 802 assume, for example, a functional module realized by the processing unit 101 of the information device 100 as the television receiver 11.

The acquisition unit 801 acquires audio information of the TV agent 310 played back through the interaction with the user and audio information of other contents different from the audio information of the TV agent 310. The audio information of the TV agent 310 is, for example, text information generated by the controller 334 in the agent system 330 converted into an audio signal by the audio composition unit 333. Furthermore, the audio information of other contents different from the audio information of the TV agent 310 is the audio information other than that of the TV agent 310 and is generated in the environment where the television receiver 11 is installed and the TV agent 310 operates. The audio information of other contents different from the audio information of the TV agent 310 is mainly the audio of the broadcasting content of the television program. Furthermore, the audio information output by the external agent device 320 (regardless of the TV agent) and the audio information such as music output from an audio equipment installed in the environment in which the TV agent 310 operates can also be included in the audio information of other contents different from the audio information of the TV agent 310.

The acquisition unit 801 acquires the audio information of the TV agent 310 from the audio composition unit 333 of the agent system 330. Furthermore, the acquisition unit 801 acquires the audio information of the broadcasting content of the television program via the tuner 102. Furthermore, the acquisition unit 801 acquires from a data broadcasting application related to the audio information of the broadcasting content via the API provided in the television receiver 11. Furthermore, the acquisition unit 801 acquires the audio information other than the broadcasting content from the sensor unit 108. Furthermore, the audio information of the content to be played back by the audio device connected to the information device 100 via the home network may be acquired via the communication unit 103.

The controller 802 is distributed and arranged in the operating environment of the TV agent 310, for example, and controls the drive of the plurality of speakers 401 to 406 linked with the television receiver 11 to generate a desired sound field. The controller 802 performs sound field control processing on the audio output signal based on the audio information of the TV agent 310 acquired by the acquisition unit 801 described above. Specifically, the controller 802 performs sound field control processing so that the audio output based on the audio information of the TV agent has a sound image localization position different from the audio output based on the audio information of other contents.

In the case of an agent service that displays the video (e.g. avatar) of the TV agent 310 on the television screen, the controller 802 localizes the sound of the TV agent 310 at the display position of the video of the TV agent 310. Furthermore, the controller 802 avoids the area of interest of the screen of the broadcasting content such as the face of the performer, displays the video of the TV agent 310, or localizes the sound image of the TV agent 310 at a position other than the area of interest. Furthermore, in a case where there is a plurality of users in the environment in which the TV agent 310 operates, the controller 802 localizes the sound image of the TV agent 310 only to the user who is the interaction partner of the TV agent 310. Furthermore, the controller 802 can also perform feedback-control for the sound field of the audio information of the TV agent 310 according to the processing procedure shown in FIG. 7.

Note that in the present embodiment, in order to link with the IoT device, it may be combined with a sound field generation technology using a head related transfer function in addition to the wavefront composition technology. For example, in a case where the IoT device is operated using the audio agent, it is conceivable to generate a response reaction audio from the direction of the IoT device to be operated. As for the IoT device, since the agent device side has the position information as the attribute information of the IoT device as described above, the effect described above can be obtained by convolving the head related transfer function corresponding to the position information into the audio signal.

Moreover, it is also possible to change the audio emitted by the audio agent on the basis of the result of sensing the environmental information in the living room. For example, in a case where a child is operating the audio agent, an audio speed emitted by the agent device may be reduced, or in a case where an elderly person is using the audio agent, sound pressure or frequency of the output audio signal may be changed.

INDUSTRIAL APPLICABILITY

The technology disclosed herein has been described above in detail with reference to the specific embodiments. However, it is obvious that a person skilled in the art can make modifications and substitutions of the embodiment without departing from the gist of the technology disclosed herein.

Although the present specification has mainly described embodiments in which the technology disclosed herein is applied to the TV agent incorporated in the television receiver, the gist of the technology disclosed herein is limited thereto. The technology disclosed herein can also be similarly applied to various agent systems that use agents incorporated in various information devices including: various CE devices and IoT devices, such as air conditioners, recorders, and washing machines; information terminals that can be carried by users, such as smartphones and tablets; wearable devices worn by users; interactive robots; and car navigation systems installed in cars, thereby, making external agent services available as needed.

In short, the technology disclosed herein has been described in the form of exemplification, and the contents described herein should not be interpreted in a limited manner. To determine the gist of the technology disclosed herein, the claims should be taken into consideration.

Note that the technology disclosed herein may have the following configurations.

(1) An information processing device including:

an acquisition unit that acquires audio information of an agent device that is played back through interaction with a user and audio information of other contents different from the audio information; and a controller that performs sound field control processing on an audio output signal based on the audio information of the agent device acquired by the acquisition unit.

(2) The information processing device according to (1) above, in which the controller performs the sound field control processing so that an audio output based on the audio information of the agent device has a sound image localization position different from that of an audio output based on the audio information of the other contents.

(3) The information processing device according to (1) above, in which the agent device is a television receiver.

(4) The information processing device according to any one of (1) to (3) above, in which the acquisition unit acquires information related to a content being played back on the agent device, through interaction with an application linked to the content being played back.

(5) The information processing device according to (4) above, in which the acquisition unit acquires the information related to the content being played back on the agent device, through a link between the application linked to the content being played back and an application server.

(6) The information processing device according to (4) above, in which the acquisition unit acquires the information from the application linked to the content being played back, via an API provided in the agent device.

(7) The information processing device according to any one of (4) to (6), in which the agent device is pre-registered in the application server.

(8) The information processing device according to any one of (4) to (7) above, in which the acquisition unit acquires the information through a link between an application linked to a broadcasting content and a broadcasting application server.

(9) The information processing device according to any one of (4) to (8) above, in which the acquisition unit acquires the information through a link between the application linked to a content being streamed and a streaming application server.

(10) The information processing device according to any one of (1) to (9) above, in which the controller controls a sound field of the agent device by wavefront composition of pieces of audio output from a plurality of speakers.

(11) The information processing device according to any one of (1) to (10) above, in which the controller localizes a sound image of the agent device to a place other than that of the agent device.

(12) The information processing device according to any one of (1) to (10) above, in which the controller localizes a sound image of the audio information of the agent device at a position of a predetermined image displayed on a screen of the agent device.

(13) The information processing device according to (12) above, in which the controller localizes the sound image of the agent device at a position other than an area of interest of the content being played back on the screen of the agent device.

(14) The information processing device according to any one of (1) to (11) above, in which the controller localizes the sound image of the agent device at a place where a specific user is present.

(15) The information processing device according to any one of (1) to (11) above, in which the controller controls an area where the audio of the agent device is heard.

(16) The information processing device according to any one of (1) to (15) above, in which each sound image of a plurality of audio information output from the agent device is localized at a different place.

(17) The information processing device according to any one of (1) to (16) above, in which the controller calculates an environment suitable for controlling the sound field and presents the calculation result.

(18) The information processing device according to (19) above, in which the controller determines suitability of the environment through interaction of the agent device with a user.

(19) An information processing method including:

an acquisition step of acquiring audio information of an agent device that is played back through interaction with a user and audio information of other contents different from the audio information; and a control step of performing sound field control processing on an audio output signal based on the audio information of the agent device acquired by the acquisition unit.

(20) An information processing system including:

an agent device that plays back audio information through interaction with a user; and a control device that acquires audio information of the agent device and audio information of other contents different from the audio information and performs sound field control processing on an audio output signal based on the audio information of the agent device.

REFERENCE SIGNS LIST

100 Information device (television receiver)
101 Processing unit
102 Tuner
103 Communication unit
104 Display unit
105 Audio input unit
106 Audio output unit
107 Imaging unit
108 Sensor unit
109 Remote control reception unit
110 Recording unit
300 Agent cloud platform
310 TV agent
320 External agent device
321 Audio input unit
322 Audio output unit
330 Agent system
331 Audio recognition unit
332 Semantic analysis unit
333 Audio composition unit
334 Controller
401 to 406 Speaker
501 Broadcasting station
502 Broadcasting application server
800 Sound field control system
801 Acquisition unit
802 Controller
900 Display
901 Speaker unit
901-1 and 901-2 Exciter (actuator)
902 Stand
1001 Video processing unit
1002 Audio processing unit
1003 Window controller
1101 Visual communication processing unit
1102 Audio processing unit
1103 Window controller
1201 Graphics processing unit
1202 Composer
1203 Audio processing unit
1204 Window controller
1201 Video processing unit
1202 Composer
1203 Audio processing unit
1204 Window controller

The invention claimed is:

1. An information processing device comprising:
an acquisition unit that acquires audio information of an agent device that is played back through interaction with a user and audio information of other contents different from the audio information of the agent device; and
a controller that performs sound field control processing on an audio output signal based on the audio information of the agent device acquired by the acquisition unit, wherein
the controller performs the sound field control processing so that an audio output based on the audio information of the agent device has a sound image localization position different from that of an audio output based on the audio information of the other contents.

2. The information processing device according to claim 1, wherein
the agent device is a television receiver.

3. The information processing device according to claim 1, wherein
the acquisition unit acquires information related to a content being played back on the agent device, through interaction with an application linked to the content being played back.

4. The information processing device according to claim 3, wherein
the acquisition unit acquires the information related to the content being played back on the agent device, through a link between the application linked to the content being played back and an application server.

5. The information processing device according to claim 3, wherein
the acquisition unit acquires the information from the application linked to the content being played back, via an API provided in the agent device.

6. The information processing device according to claim 3, wherein
the agent device is pre-registered in the application server.

7. The information processing device according to claim 3, wherein
the acquisition unit acquires the information through a link between an application linked to a broadcasting content and a broadcasting application server.

8. The information processing device according to claim 3, wherein
the acquisition unit acquires the information through a link between an application linked to a content being streamed and a streaming application server.

9. The information processing device according to claim 1, wherein
the controller controls a sound field of the agent device by wavefront composition of pieces of audio output from a plurality of speakers.

10. The information processing device according to claim 1, wherein
the controller localizes a sound image of the agent device to a place other than that of the agent device.

11. The information processing device according to claim 1, wherein
the controller localizes a sound image of the audio information of the agent device at a position of a predetermined image displayed on a screen of the agent device.

12. The information processing device according to claim 11, wherein
the controller localizes the sound image of the agent device at a position other than an area of interest of the content being played back on the screen of the agent device.

13. The information processing device according to claim 1, wherein
the controller localizes the sound image of the agent device at a place where a specific user is present.

14. The information processing device according to claim 1, where
the controller controls an area where the audio of the agent device is heard.

15. The information processing device according to claim 1, wherein
each sound image of a plurality of audio information output from the agent device is localized at a different place.

16. The information processing device according to claim 1, wherein
the controller calculates an environment suitable for controlling the sound field and presents the calculation result.

17. The information processing device according to claim 16, wherein
the controller determines suitability of the environment through interaction of the agent device with a user.

18. An information processing method comprising:
an acquisition step of acquiring audio information of an agent device that is played back through interaction with a user and audio information of other contents different from the audio information of the agent device; and
a control step of performing sound field control processing on an audio output signal based on the audio information of the agent device acquired by the acquisition unit, wherein
the control step includes performing the sound field control processing so that an audio output based on the audio information of the agent device has a sound image localization position different from that of an audio output based on the audio information of the other contents.

19. An information processing system comprising:
an agent device that plays back audio information through interaction with a user; and
a control device that acquires audio information of the agent device and audio information of other contents different from the audio information of the agent device, and performs sound field control processing on an audio output signal based on the audio information of the agent device, wherein
the control device performs the sound field control processing so that an audio output based on the audio information of the agent device has a sound image localization position different from that of an audio output based on the audio information of the other contents.

* * * * *